United States Patent
Einhaus et al.

(10) Patent No.: US 10,128,927 B2
(45) Date of Patent: Nov. 13, 2018

(54) CHANNEL STATE INFORMATION REPORTING ENHANCEMENT FOR NETWORK ASSISTED INTERFERENCE CANCELLATION AND SUPPRESSION

(71) Applicant: Panasonic Intellectual Property Corporation of America, Torrance, CA (US)

(72) Inventors: Michael Einhaus, Darmstadt (DE); Alexander Golitschek Edler von Elbwart, Darmstadt (DE); Li Wang, Beijing (CN); Hidetoshi Suzuki, Kanagawa (JP); Masayuki Hoshino, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 169 days.

(21) Appl. No.: 15/121,358

(22) PCT Filed: May 19, 2014

(86) PCT No.: PCT/CN2014/077792
§ 371 (c)(1),
(2) Date: Aug. 24, 2016

(87) PCT Pub. No.: WO2015/176209
PCT Pub. Date: Nov. 26, 2015

(65) Prior Publication Data
US 2017/0126298 A1    May 4, 2017

(51) Int. Cl.
*H04B 7/06* (2006.01)
*H04B 17/24* (2015.01)
(Continued)

(52) U.S. Cl.
CPC ........ *H04B 7/0626* (2013.01); *H04B 7/0456* (2013.01); *H04B 7/0617* (2013.01);
(Continued)

(58) Field of Classification Search
CPC ... H04L 5/0048; H04L 5/0073; H04B 7/0626; H04B 7/0632
See application file for complete search history.

(56) References Cited

U.S. PATENT DOCUMENTS

2012/0213261 A1* 8/2012 Sayana ................. H04L 5/0048
375/224
2012/0236736 A1    9/2012 Frank et al.
(Continued)

FOREIGN PATENT DOCUMENTS

| CN | 103391126 A | 11/2013 |
|----|-------------|---------|
| CN | 103391158 A | 11/2013 |
| WO | 2014/004897 A1 | 1/2014 |

OTHER PUBLICATIONS

3GPP TR 36.866 V12.0.0, "3rd Generation Partnership Project; Technical Specification Group Radio Access Network; Study on Network Assisted Interference Cancellation and Suppression (NAIC) for LTE (Release 12)," Technical Report, Mar. 2014, 63 pages.
(Continued)

*Primary Examiner* — Chi H Pham
*Assistant Examiner* — Weibin Huang
(74) *Attorney, Agent, or Firm* — Seed IP Law Group LLP

(57) ABSTRACT

The present invention relates to reporting feedback concerning reception quality under at least two different assumptions of interference conditions, i.e. two interference hypotheses. In particular, a first and a second reception quality are determined for the same reference resource under two
(Continued)

different interference hypotheses. The first and the second reception quality are then transmitted within the same channel state message.

17 Claims, 9 Drawing Sheets

(51) Int. Cl.
*H04B 17/345* (2015.01)
*H04B 7/0456* (2017.01)
*H04L 5/00* (2006.01)

(52) U.S. Cl.
CPC ......... *H04B 7/0632* (2013.01); *H04B 7/0639* (2013.01); *H04B 17/24* (2015.01); *H04B 17/345* (2015.01); *H04L 5/0048* (2013.01); *H04L 5/0073* (2013.01)

(56) References Cited

U.S. PATENT DOCUMENTS

| | | | | |
|---|---|---|---|---|
| 2012/0327874 | A1* | 12/2012 | Eriksson | H04L 5/0057 370/329 |
| 2013/0155973 | A1 | 6/2013 | Geirhofer et al. | |
| 2014/0112173 | A1* | 4/2014 | Hammarwall | H04L 1/0026 370/252 |
| 2014/0169204 | A1* | 6/2014 | Cheng | H04L 1/0026 370/252 |
| 2015/0155999 | A1* | 6/2015 | Gao | H04L 1/0026 370/329 |
| 2015/0288505 | A1* | 10/2015 | Park | H04L 5/0073 370/336 |
| 2016/0013898 | A1* | 1/2016 | Lee | H04W 24/00 370/329 |
| 2016/0241434 | A1* | 8/2016 | Li | H04B 7/2656 |
| 2016/0249364 | A1* | 8/2016 | Siomina | H04W 72/082 |

OTHER PUBLICATIONS

3GPP TS 36.211 V12.1.0, "3$^{rd}$ Generation Partnership Project; Technical Specification Group Radio Access Network; Evolved Universal Terrestrial Radio Access (E-UTRA); Physical channels and modulation (Release 12)," Mar. 2014, 120 pages.

3GPP TS 36.212 V12.0.0, "3$^{rd}$ Generation Partnership Project; Technical Specification Group Radio Access Network; Evolved Universal Terrestrial Radio Access (E-UTRA); Multiplexing and channel coding (Release 12)," Dec. 2013, 88 pages.

3GPP TS 36.213 V12.1.0, "3$^{rd}$ Generation Partnership Project; Technical Specification Group Radio Access Network; Evolved Universal Terrestrial Radio Access (E-UTRA); Physical layer procedures (Release 12)," Mar. 2014, 186 pages.

3GPP TS 36.331 V12.1.0, "3$^{rd}$ Generation Partnership Project; Technical Specification Group Radio Access Network; Evolved Universal Terrestrial Radio Access (E-UTRA); Radio Resource Control (RRC); Protocol specification (Release 12),"Mar. 2014, 356 pages.

International Search Report dated Mar. 3, 2015, for corresponding International Application No. PCT/CN2014/077792, 2 pages.

MediaTek Inc. "New work item proposal for network assistance interference cancellation and suppression for LTE," RP-140519, 3GPP TSG RAN Meeting #63, Agenda Item: 14.1.1, Fukuoka, Japan, Mar. 3-6, 2014, 7 pages.

Notice of Reasons for Rejection, dated Feb. 6, 2018, for the related Japanese Patent Application No. 2016-559648, 7 pages (with English Translations).

* cited by examiner

CHANNEL STATE INFORMATION REPORTING ENHANCEMENT FOR NETWORK ASSISTED INTERFERENCE CANCELLATION AND SUPPRESSION

The present invention relates to transmission of channel state information in a cellular communication system.

TECHNOLOGY BACKGROUND

Third generation (3G) mobile cellular systems, such as, for instance, universal mobile telecommunication systems (UMTS) standardized within the third generation partnership project (3GPP) have been based on wideband code division multiple access (WCDMA) radio access technology. Today, 3G systems are being deployed on a broad scale all around the world. After enhancing this technology by introducing high-speed downlink packet access (HSDPA) and an enhanced uplink, also referred to as high-speed uplink packet access (HSUPA), the next major step in evolution of the UMTS standard has brought the combination of orthogonal frequency division multiplexing (OFDM) for the downlink and single carrier frequency division multiplexing access (SC-FDMA) for the uplink. This system has been named long term evolution (LTE) since it has been intended to cope with future technology evolutions.

The LTE system represents efficient packet based radio access and radio access networks that provide full IP-based functionalities with low latency and low cost. The downlink supports data modulation schemes QPSK, 16QAM, and 64QAM and the uplink supports QPSK, 16QAM, and at least for some devices also 64QAM, for physical data channel transmissions. The term "downlink" denotes direction from the network to the terminal. The term "uplink" denotes direction from the terminal to the network.

LTE's network access is extremely flexible, using a number of defined channel bandwidths between 1.4 and 20 MHz, contrasted with UMTS terrestrial radio access (UTRA) fixed 5 MHz channels. Spectral efficiency is increased by up to four-fold compared with UTRA, and improvements in architecture and signaling reduce round-trip latency. Multiple Input/Multiple Output (MIMO) antenna technology should enable 10 times as many users per cell as 3GPP's original WCDMA radio access technology. To suit as many frequency band allocation arrangements as possible, both paired (frequency division duplex FDD) and unpaired (time division duplex TDD) band operation is supported. LTE can co-exist with earlier 3GPP radio technologies, even in adjacent channels, and calls can be handed over to and from all 3GPP's previous radio access technologies.

An LTE network architecture including network entities and interfaces between them is exemplified in FIG. 1. As can be seen in FIG. 1, the LTE architecture supports interconnection of different radio access networks (RAN) such as UTRAN or GERAN (GSM EDGE Radio Access Network), which are connected to the EPC via the Serving GPRS Support Node (SGSN). In a 3GPP mobile network, the mobile terminal 110 (called User Equipment, UE, or device) is attached to the access network via the Node B (NB) in the UTRAN and via the evolved Node B (eNB) in the E-UTRAN access. The NB and eNB 120 entities are known as base station in other mobile networks. There are two data packet gateways located in the EPS for supporting the UE mobility—Serving Gateway (SGW) 130 and Packet Data Network Gateway 160 (PDN-GW or shortly PGW). Assuming the E-UTRAN access, the eNB entity 120 may be connected through wired lines to one or more SGWs via the S1-U interface ("U" stays for "user plane") and to the Mobility Management Entity 140 (MME) via the S1-MMME interface. The SGSN 150 and MME 140 are also referred to as serving core network (CN) nodes.

As shown above, the E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNBs are interconnected with each other by means of the X2 interface.

FIG. 2 illustrates structure of a component carrier in LTE Release 8 and later releases. The downlink component carrier of the 3GPP LTE Release 8 is sub-divided in the time-frequency domain in so-called sub-frames each of which is divided into two downlink slots, one of which is shown in FIG. 2 as corresponding to a time period $T_{slot}$. The first downlink slot comprises a control channel region within the first OFDM symbol(s). Each sub-frame consists of a given number of OFDM symbols in the time domain, each OFDM symbol spanning over the entire bandwidth of the component carrier.

In particular, the smallest unit of resources that can be assigned by a scheduler is a resource block also called physical resource block (PRB). A PRB is defined as $N_{symb}^{DL}$ consecutive OFDM symbols in the time domain and $N_{sc}^{RB}$ consecutive sub-carriers in the frequency domain. In practice, the downlink resources are assigned in resource block pairs. A resource block pair consists of two resource blocks. It spans $N_{sc}^{RB}$ consecutive sub-carriers in the frequency domain and the entire $2 \cdot N_{symb}^{DL}$ modulation symbols of the sub-frame in the time domain. $N_{symb}^{DL}$ may be either 6 or 7 resulting in either 12 or 14 OFDM symbols in total. Consequently, a physical resource block consists of $N_{symb}^{DL} \times N_{sc}^{RB}$ resource elements corresponding to one slot in the time domain and 180 kHz in the frequency domain (further details on the downlink resource grid can be found, for example, in Section 6.2 of the 3GPP TS 36.211, "*Evolved universal terrestrial radio access (E-UTRA); physical channels and modulations (Release 12)*", version 12.1.0, March 2014, freely available at www.3gpp.org, which is incorporated herein by reference and denoted as "TS 36.211" in the following). While it can happen that some resource elements within a resource block or resource block pair are not used even though it has been scheduled, for simplicity of the used terminology still the whole resource block or resource block pair is assigned. Examples for resource elements that are actually not assigned by a scheduler include reference signals, broadcast signals, synchronization signals, and resource elements used for various control signal or channel transmissions.

The number of physical resource blocks $N_{RB}^{DL}$ in downlink depends on the downlink transmission bandwidth configured in the cell and is at present defined in LTE as being from the interval of 6 to 110 (P)RBs. It is common practice in LTE to denote the bandwidth either in units of Hz (e.g. 10

MHz) or in units of resource blocks, e.g. for the downlink case the cell bandwidth can equivalently expressed as e.g. 10 MHz or $N_{RB}^{DL}=50$ RB.

Generally, it may be assumed that a resource block designates the smallest resource unit on an air interface of a mobile communication that can be assigned by a scheduler for transmitting data. The dimensions of a resource block may be any combination of time (e.g. time slot, sub-frame, frame, etc. for time division multiplex (TDM)), frequency (e.g. subband, carrier frequency, etc. for frequency division multiplex (FDM)), code (e.g. spreading code for code division multiplex (CDM)), antenna (e.g. Multiple Input Multiple Output (MIMO)), etc. depending on the access scheme used in the mobile communication system.

In 3GPP LTE Release 8 the downlink control signalling is basically carried by the following three physical channels:

Physical control format indicator channel (PCFICH) for indicating the number of OFDM symbols used for control signalling in a sub-frame (i.e. the size of the control channel region);

Physical hybrid ARQ indicator channel (PHICH) for carrying the downlink ACK/NACK associated with uplink data transmission; and Physical downlink control channel (PDCCH) for carrying downlink scheduling assignments and uplink scheduling assignments.

The PCFICH is sent from a known position within the control signalling region of a downlink sub-frame using a known pre-defined modulation and coding scheme. The user equipment decodes the PCFICH in order to obtain information about a size of the control signalling region in a sub-frame, for instance, the number of OFDM symbols. If the user equipment (UE) is unable to decode the PCFICH or if it obtains an erroneous PCFICH value, it will not be able to correctly decode the L1/L2 control signalling (PDCCH) comprised in the control signalling region, which may result in losing all resource assignments contained therein.

The PDCCH carries downlink control information, such as, for instance, scheduling grants for allocating resources for downlink or uplink data transmission. The PDCCH for the user equipment is transmitted on the first of either one, two or three OFDM symbols according to PCFICH within a sub-frame.

Physical downlink shared channel (PDSCH) is used to transport user data. PDSCH is mapped to the remaining OFDM symbols within one sub-frame after PDCCH. The PDSCH resources allocated for one UE are in the units of resource block for each sub-frame.

Physical uplink shared channel (PUSCH) carries user data. Physical Uplink Control Channel (PUCCH) carries signalling in the uplink direction such as scheduling requests, HARQ positive and negative acknowledgements in response to data packets on PDSCH, and channel state information (CSI).

User data (IP packets) to be transmitted over the communication network may be generated by the user application. They may include speech, video, text, or any other media possibly compressed and encapsulated into other protocols before forming the IP packets. The IP packets are in EUTRAN further processed on the PDCP layer resulting in addition of a PDCP header. The PDCP packets formed in this manner are further segmented and/or reassembled (reassembling being shown in the figure) into RLC packets to which an RLC header is added. One or more RLC packets are then encapsulated into a MAC packet including also a MAC header and padding, if necessary. The MAC packet is also called "transport block". Thus, a transport block is from the point of view of the physical layer a packet of user data entering the physical layer. There are predefined transport block sizes (TBS) which may be used in LTE. The transport block is then within one transmission time interval (TTI) mapped onto the subframes on the physical layer (PHY). Details of the mapping of data starting with transport blocks up to the interleaving is shown in FIGS. 5.2.2-1 and 5.3.2-1 and described in the related description of the 3GPP TS 36.212, v.12.0.0, *"Evolved universal terrestrial radio access (E-UTRA); Multiplexing and channel coding"*, 2013, denoted in the following as TS 36.212 available freely at www.3qpp.org and incorporated herein by reference, for the uplink and downlink transmission of user data respectively. Furthermore, the physical channel mapping is described in detail in FIGS. 6.3-1 and FIGS. 5.3-1 for downlink and uplink, respectively, and the related description in the 3GPP TS 36.211.

The principle of link adaptation is fundamental to the design of a radio interface which is efficient for packet-switched data traffic. Unlike the early versions of UMTS (Universal Mobile Telecommunication System), which used fast closed-loop power control to support circuit-switched services with a roughly constant data rate, link adaptation in LTE adjusts the transmitted data rate (modulation scheme and channel coding rate) dynamically to match the prevailing radio channel capacity for each user.

For the downlink data transmissions in LTE, the eNodeB typically selects the modulation scheme and code rate (MCS) depending on a prediction of the downlink channel conditions. An important input to this selection process is the Channel State Information (CSI) feedback (mentioned above) transmitted by the User Equipment (UE) in the uplink to the eNodeB.

Channel state information is used in a multi-user communication system, such as for example 3GPP LTE to determine the quality of channel resource(s) for one or more users. In general, in response to the CSI feedback the eNodeB can select between QPSK, 16-QAM and 64-QAM schemes and a wide range of code rates. This CSI information may be used to aid in a multi-user scheduling algorithm to assign channel resources to different users, or to adapt link parameters such as modulation scheme, coding rate or transmit power, so as to exploit the assigned channel resources to its fullest potential. In order to select appropriate transmission parameter for a PDSCH transmission, the serving eNB relies on channel state information (CSI) reporting from the UE, which in LTE consists of the following:

Rank Indicator (RI)
Precoding Matrix Indicator (PMI)
Channel Quality Indicator (CQI)

The CQI is used as input for the link adaptation algorithm in terms of MCS selection. The exact format of the CSI message depends on the reporting mode. The CQI may include separately coded wideband CQI and one or more subband CQIs, which are differentially coded with respect to the wideband CQI. The reporting mode is configurable by means of RRC signaling as described in 3GPP TS 36.331, v.12.1.0, 2014, "Radio Resource Control: Protocol specification", freely available under www.3gpp.org. Reporting modes currently supported by LTE are defined in 3GPP TS 36.213,v.12.1.0, 2014, "Physical Layer Procedures" freely available under www.3.gpp.orq, and in particular in Section 6.2, e.g. information element "CQIreportConfig".

The uplink and downlink resource grants (grants enabling the UE to transmit data in downlink and uplink, respectively) are transmitted from the eNodeB to the UE in a downlink control information (DCI) via PDCCH. The downlink control information may be transmitted in different formats, depending on the signaling information necessary. In general, the DCI may include: a resource block assignment (RBA) and modulation and coding scheme (MCS).

It may include further information, such as HARQ related information like redundancy version (RV), HARQ process number, or new data indicator (NDI); MIMO related information such as pre-coding; power control related information, etc.

As described above, in order to inform the scheduled users about their allocation status, transport format and other data-related information (e.g. HARQ information, transmit power control (TPC) commands), L1/L2 control signaling is transmitted on the downlink along with the data. L1/L2 control signaling is multiplexed with the downlink data in a subframe, assuming that the user allocation can basically change from subframe to subframe. It should be noted that user allocation might also be performed on a TTI (Transmission Time Interval) basis, where the TTI length can be in general a multiple of the subframes or correspond to a subframe. The TTI length may be fixed in a service area for all users, may be different for different users, or may even by dynamic for each user. Generally, the L1/2 control signaling needs only be transmitted once per TTI. Without loss of generality, the following assumes that a TTI is equivalent to one subframe.

In 3GPP LTE, assignments for uplink data transmissions, also referred to as uplink scheduling grants or uplink resource assignments, are also transmitted on the PDCCH. Generally, the information sent on the L1/L2 control signaling for assigning uplink or downlink radio resources (particularly LTE(-A) Release 10) can be categorized to the following items:

User identity, indicating the user that is allocated. This is typically included in the checksum by masking the CRC with the user identity. Then, the users (UEs) perform blind decoding by demasking the identities transmitted in the search space (i.e. in the resources configured as search space in which the respective terminals have to monitor the control information whether there is data for them).

Resource allocation information, indicating the resources (Resource Blocks, RBs) on which a user is allocated. Note, that the number of RBs on which a user is allocated can thus be dynamic. In particular, the number of the resource blocks (frequency domain) is carried by the resource allocation information. The position in the time domain (subframe) is given by the subframe in which the PDCCH is received and a predefined rule (the resources are allocated fixed number of subframes after the PDCCH subframe).

Carrier indicator, which is used if a control channel transmitted on a first carrier assigns resources that concern a second carrier, i.e. resources on a second carrier or resources related to a second carrier if carrier aggregation is applied.

Modulation and coding scheme that determines the employed modulation scheme and coding rate (length of the transport block to be coded).

HARQ information, such as a new data indicator (NDI) and/or a redundancy version (RV) that is particularly useful in retransmissions of data packets or parts thereof. In particular, new data indicator indicated whether the allocation is for an initial transmission of data or for a retransmission of data. Redundancy version indicates the coding applied to the retransmitted data (in LTE incremental redundancy combining is supported, meaning that each retransmission may include the data of the first transmission differently coded, i.e. may include parity bits which together with the already received transmission/retransmission(s) finally enable decoding).

Power control commands to adjust the transmit power of the assigned uplink data or control information transmission.

Reference signal information such as the applied cyclic shift and/or orthogonal cover code index, which are to be employed for transmission or reception of reference signals related to the assignment.

Uplink or downlink assignment index that is used to identify an order of assignments, which is particularly useful in TDD systems.

Hopping information, e.g. an indication whether and how to apply resource hopping in order to increase the frequency diversity.

CSI request, which is used to trigger the transmission of channel state information in an assigned resource.

Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission depending on the DCI format that is used.

Downlink control information occurs in several formats that differ in overall size and also in the information contained in its fields. The different DCI formats that are currently defined for LTE are as follows and described in detail in 3GPP TS 36.212, v.12.0.0 "Multiplexing and channel coding", section 5.3.3.1 (available at http://www.3gpp.org and incorporated herein by reference). For instance, DCI Format 0 is used for the transmission of resource grants for the PUSCH, using single-antenna port transmissions in uplink transmission mode 1 or 2.

In order for the UE to identify whether it has received a PDCCH transmission correctly, error detection is provided by means of a 16-bit CRC appended to each PDCCH (i.e. DCI). Furthermore, it is necessary that the UE can identify which PDCCH(s) are intended for it. This could in theory be achieved by adding an identifier to the PDCCH payload; however, it turns out to be more efficient to scramble the CRC with the "UE identity", which saves the additional overhead. The CRC may be calculated and scrambled as defined in detail by 3GPP in TS 36.212, Section 5.3.3.2 "CRC attachment", incorporated hereby by reference. The section describes how error detection is provided on DCI transmissions through a Cyclic Redundancy Check (CRC). A brief summary is given below. The entire payload is used to calculate the CRC parity bits. The parity bits are computed and attached. In the case where UE transmit antenna selection is not configured or applicable, after attachment, the CRC parity bits are scrambled with the corresponding RNTI.

Correspondingly, the UE descrambles the CRC by applying the "UE identity" and, if no CRC error is detected, the UE determines that PDCCH carries its control information intended for itself. The terminology of "masking" and "de-masking" is used as well, for the above-described process of scrambling a CRC with an identity. The "UE identity" mentioned above with which the CRC of the DCI may be scrambled can also be a SI-RNTI (System Information Radio Network Temporary Identifier), which is not a "UE identity" as such, but rather an identifier associated with the type of information that is indicated and transmitted, in this case the system information. The SI-RNTI is usually fixed in the specification and thus known a priori to all UEs.

The physical downlink control channel (PDCCH) carries e.g. scheduling grants for allocating resources for downlink or uplink data transmission. Multiple PDCCHs can be transmitted in a subframe. The PDCCH for the user equipments is transmitted on the first $N_{symb}^{PDCCH}$ OFDM symbols (usually either 1, 2 or 3 OFDM symbols as indicated by the PCFICH, in exceptional cases either 2, 3, or 4 OFDM symbols as indicated by the PCFICH) within a subframe, extending over the entire system bandwidth; the system bandwidth is typically equivalent to the span of a cell or component carrier. The region occupied by the first $N_{symb}^{PDCCH}$ OFDM symbols in the time domain and the $N_{RB}^{DL} \times N_{sc}^{RB}$ subcarriers in the frequency domain is also referred to as PDCCH region or control channel region. The remaining $N_{symb}^{PDCCH} = 2 \cdot N_{symb}^{DL} - N_{symb}^{PDCCH}$ OFDM symbols in the time domain on the $N_{RB}^{DL} \times N_{sc}^{RB}$ subcarriers in the frequency domain is referred to as the PDSCH region or shared channel region (see below).

On a transport channel level, the information transmitted via the PDCCH is also referred to as L1/L2 control signaling (for details on L1/L2 control signaling see above).

The idea behind the concept of interference cancellation and interference suppression is that the effective signal to interference power ratio in the receiver can be increased if the interference fraction of the received signal can be removed or suppressed in the receiver. In order to achieve this, the knowledge of the type and strength of the interference is beneficial.

FIG. 3 illustrates the basic concept of interference cancellation in the receiver. A signal S is generated by the receiver and transmitted over a channel. During the transmission it is superimposed by interference I and noise N. This results in a disturbed signal which is inputted to a receiver and which may lead to some bit errors in the demodulator. In order to improve the reception and in particular, the bit error rate resulting from demodulation and decoding, interference cancellation (marked by a dashed rectangle in FIG. 3) may be applied. In particular, an interference estimation I' available in the receiver is used to recover signal S' which is further used as an input for the demodulator reducing therewith the bit error rate. In this example, the recovery is achieved by subtracting the estimated interference signal I' form the received signal S+N+I. The performance of interference cancellation strongly depends on the accuracy of the interference estimation I'. In case of a very inaccurate interference estimation which corresponds to a large difference between I and I', it could even result in an increased disturbance of the demodulator input yielding an increased bit error rate.

The interference I is determined by a combination of some transmission (interference) parameters. The accuracy of the interference estimation I' increases with the amount of information regarding the interference parameters that is available on the receiver side.

In order to translate the SINR increased by successful interference cancellation or suppression into actual throughput gains, the expected SINR gain has to be taken into account for the modulation and coding scheme (MSC) selection prior to the data transmission on the eNB side. The SINR prediction is usually conducted by a combination of channel quality reporting from the UE and the evaluation of ACK/NACK statistics in the eNB. This approach is also known as OLLA (outer-loop link adaptation) within the scope of 3GPP TR 36.866 v12.0.0, March 2014, "Study on Network-Assisted Interference Cancellation and Suppression (NAIC) for LTE" (referred to as "NAICS technical report" in the following). The OLLA represents a control loop that uses the channel quality reports from the UE and the observation of transmission errors as input for the MCS selection. The observed transmission error rate (ACK/NACK statistics) can be seen here as a metric for the accuracy of the proper MCS selection. If the number of transmission errors is too high, the MCS selection can be considered as too aggressive; and if the number of transmission errors to very low, the MCS selection can be considered as too conservative. A schematic representation of the link adaptation is shown in FIG. 4. In particular, the link adaptation unit applies a link adaptation algorithm by evaluating the statistics of the (positive or negative) acknowledgements and channel quality information (CQI) received from the terminal.

FIG. 5 shows a typical scenario with interference from a single dominant interfering cell. UEs 501, 502, 503 and 504 are served by an eNB A and experience interference from eNB B. UE 501 and UE 502 experience weak interference from eNB B since they are far away from the interference source (eNB B), while UE 503 and UE 504 experience strong interference from eNB B. The dashed circle 500 indicates the area, in which the interference from the eNB B is dominant for the terminals served by the eNB A. For the purpose of improving the reception quality in the terminals located within the area 500, the interference cancellation and thus also the accuracy of the interference estimation may be essential.

Recently, 3GPP initiated a study item concerning network assisted interference cancellation and suppression (NAICS) for the downlink in 3GPP LTE systems. Details are described in the NAICS technical report cited above. Based thereon, a subsequent work item is supposed to specify inclusion of the network assisted interference cancellation into the standard, as can be seen from RP-140519, "New work item proposal for network assistance interference cancellation and suppression for LTE", 3GPP RAN#63, March 2014, referred to as "NAICS work item" in the following.

The parameters in an LTE system which influence the interference (interference parameters) comprise
  Position of reference signals (pilot) within the resource grid of the interfering transmission (e.g. by eNB B of FIG. 5),
  Effective interference channel including precoding on the interference transmitter side,
  Interferer resource allocation in terms of allocated resources (PRBs, CFI, etc.),
  Number of spatial transmission layers of the interfering transmission,
  Modulation order of the interfering transmission,
  Channel coding parameters of the interfering transmission (code rate, redundancy version, etc.).

The amount of required interference information depends hereby on the receiver type. The receiver types investigated at 3GPP range from receivers that suppress the interference by means of spatial filtering of the sum signal to receivers that perform the complete decoding of code words transmitted by the interference source.

A receiver that performs merely an interference suppression by means of spatial filtering of the received signal (e.g. E-LMMSE-IRC in the NAICS technical report, Section 7.2) requires only information about the effective interference channel (including precoding on the interference transmitter side) per spatial layer, while information about modulation and coding scheme, redundancy version, etc. are not required.

On the other hand, a receiver that performs interference cancellation either on symbol (SL-IC, cf. NAICS technical report, Section 7.4) or on codeword level (CW-IC, cf. NAICS technical report, Section 7.4) requires a significantly extended amount of interference information. In particular, on the receiver side it has to be known which modulation symbol was transmitted in order to perform effective interference cancellation as show in FIG. 4. A detailed description of the receiver types studied at 3GPP RAN1 within the scope of NAISC is given in the NAICS technical report cited above. Accordingly, also different approaches can be considered for obtaining interference parameters in LTE system:

- Blind detection: The interference parameters are estimated within the receiver by means of hypothesis testing. This approach does not involve any network assistance but constitutes increased computation complexity in the receiver.
- Overhearing of control signals (DCI, reference signals, etc.) from interfering eNB: The interference parameters are determined in the receiver by listening to existing control signals from the interfering cell itself.
- L1 signalling from interfering eNB: This approach addresses the introduction of new L1 (physical layer) signalling for the provision of interference information. This control information is to be transmitted by the interfering eNB.
- Higher-layer signalling from serving eNB: Interference information is provided to the interference victim UE by the serving eNB by means of downlink control messages on MAC layer or above.
- L1 signalling from serving eNB: Interference information is provided to the interference victim UE by the serving eNB by means of downlink control signalling on the physical layer.

The network assisted interference handling (cancellation or suppression) enables achieving higher reception quality in terms of SINR. The receiving devices such as UE report their reception quality to the network so that the network can allocate resources accordingly. The reception quality depends on whether interference cancellation was performed or not and under which interference hypothesis the interference cancellation was performed. In particular, as explained above, the interference parameters may indicate various transmission characteristics of the interfering nodes. Such characteristics form then an interference hypothesis, i.e. an estimation of the interference on the basis of such parameters. According to the estimated interference, the received signal is processed by applying the interference cancellation and suppression. The network receives then channel quality report. In order to reliably perform link adaptation, efficient signalling of the feedback concerning channel quality is necessary.

SUMMARY OF THE INVENTION

It is the aim of the present invention to provide an efficient signalling of feedback information which would be also suitable for network assisted interference cancellation or suppression.

This is achieved by the features as set forth in the independent claims.

Preferred embodiments of the present invention are the subject matter of the dependent claims.

The particular approach of the present invention is to provide within one message at least two feedbacks including channel quality information determined on the basis of respective two or more different interference hypotheses.

In accordance with an aspect of the present invention, an apparatus is provided for receiving data from a network node, the apparatus comprising a receiving unit for receiving a reference signal from the network node; a channel state determination unit for determining a first channel quality according to the reference signal received by the receiving unit and processed in accordance with a first interference hypothesis and a second channel quality according to said reference signal and processed in accordance with another second interference hypothesis; and a transmission unit for transmitting the first channel quality and the second channel quality in a channel quality message to the network node.

In accordance with another aspect of the present invention, an apparatus is provided for transmitting data, the apparatus comprising a receiving unit for receiving a first channel quality and a second channel quality in a channel state information message received from a data receiving apparatus, the first channel quality being determined in accordance with a first interference hypothesis, the second channel quality being determined in accordance with another second interference hypothesis; a link adaptation unit for determining link configuration based on the first channel quality and the second channel quality; and a transmission unit for transmitting to a data receiving apparatus the data according to the determined link parameters.

Moreover, a method is provided for receiving data from a network node, the method comprising the steps of: receiving a reference signal from the network node; determining a first channel quality according to the reference signal received by the receiving unit and processed in accordance with a first interference hypothesis and a second channel quality according to said reference signal and processed in accordance with another second interference hypothesis; and transmitting the first channel quality and the second channel quality in a channel quality message to the network node.

Furthermore, a method is provided for transmitting data to be executed in a network node, the method comprising the steps of: receiving a first channel quality and a second channel quality in a channel state information message received from a data receiving apparatus, the first channel quality being determined in accordance with a first interference hypothesis, the second channel quality being determined in accordance with another second interference hypothesis; determining link configuration based on the first channel quality and the second channel quality; and transmitting to a data receiving apparatus the data according to the determined link parameters.

The above objectives and other objectives and features of the present invention will become more apparent from the following description and preferred embodiments, given in conjunction with the accompanying drawings in which.

DETAILED DESCRIPTION

The invention addresses the support of inter-cell interference cancellation and suppression by means of network assistance. Interference cancellation and suppression on UE side can significantly increase downlink user throughput due to increased PDSCH SINR. In order to translate the SINR gains into throughput gains, the expected SINR gains have to be predicted accurately on the serving eNB side for facilitating proper modulation and coding scheme (MCS) selection. The SINR prediction is usually conducted by a combination of channel quality reporting from the UE and the evaluation of ACK/NACK statistics. In order to facilitate accurate SINR prediction for proper MCS selection in the eNB it is expected to be beneficial to have multiple CSI reports for different interference hypotheses available as input for the link adaptation algorithm.

Figure 1:
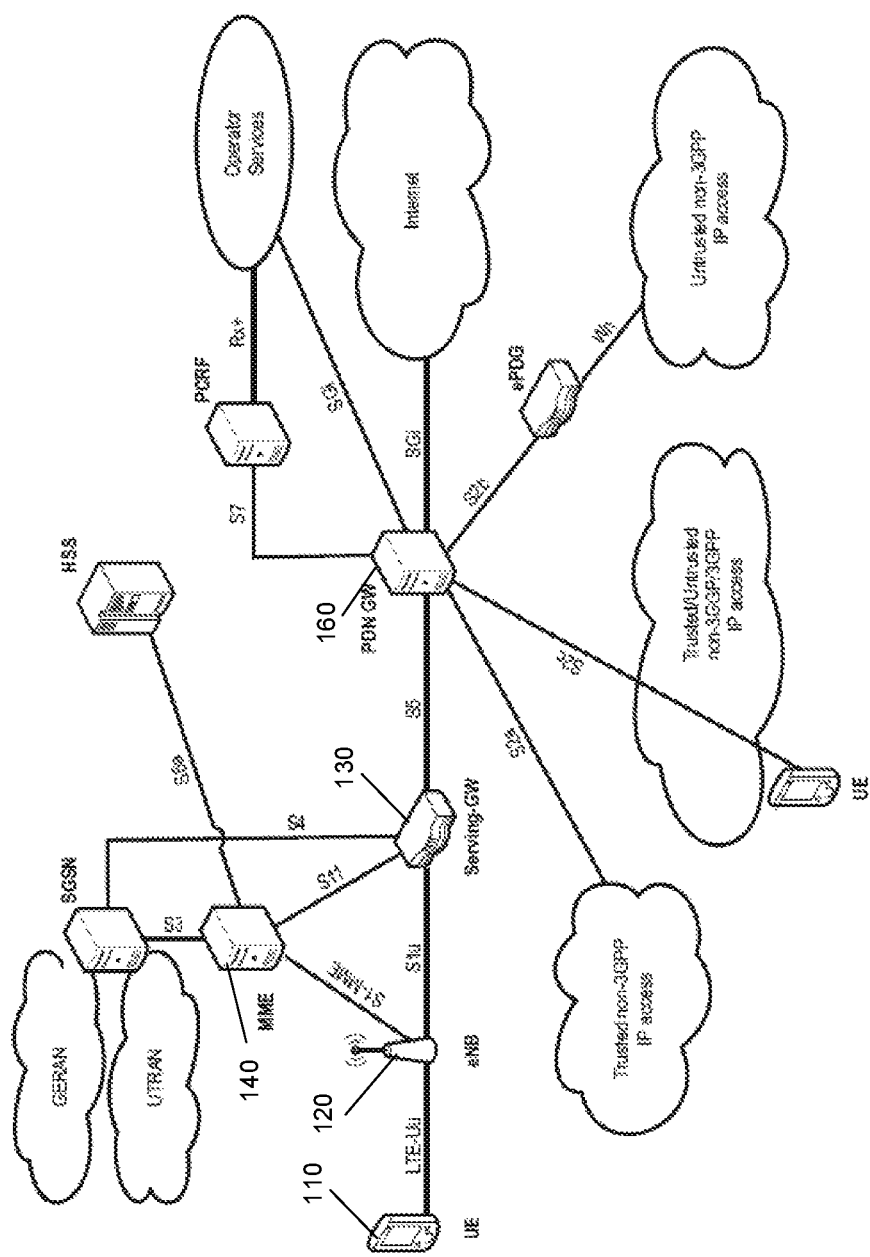
FIG. 1 is a block diagram illustrating an example of physical layer processing of four services in a digital broadcast system.
Figure 2:
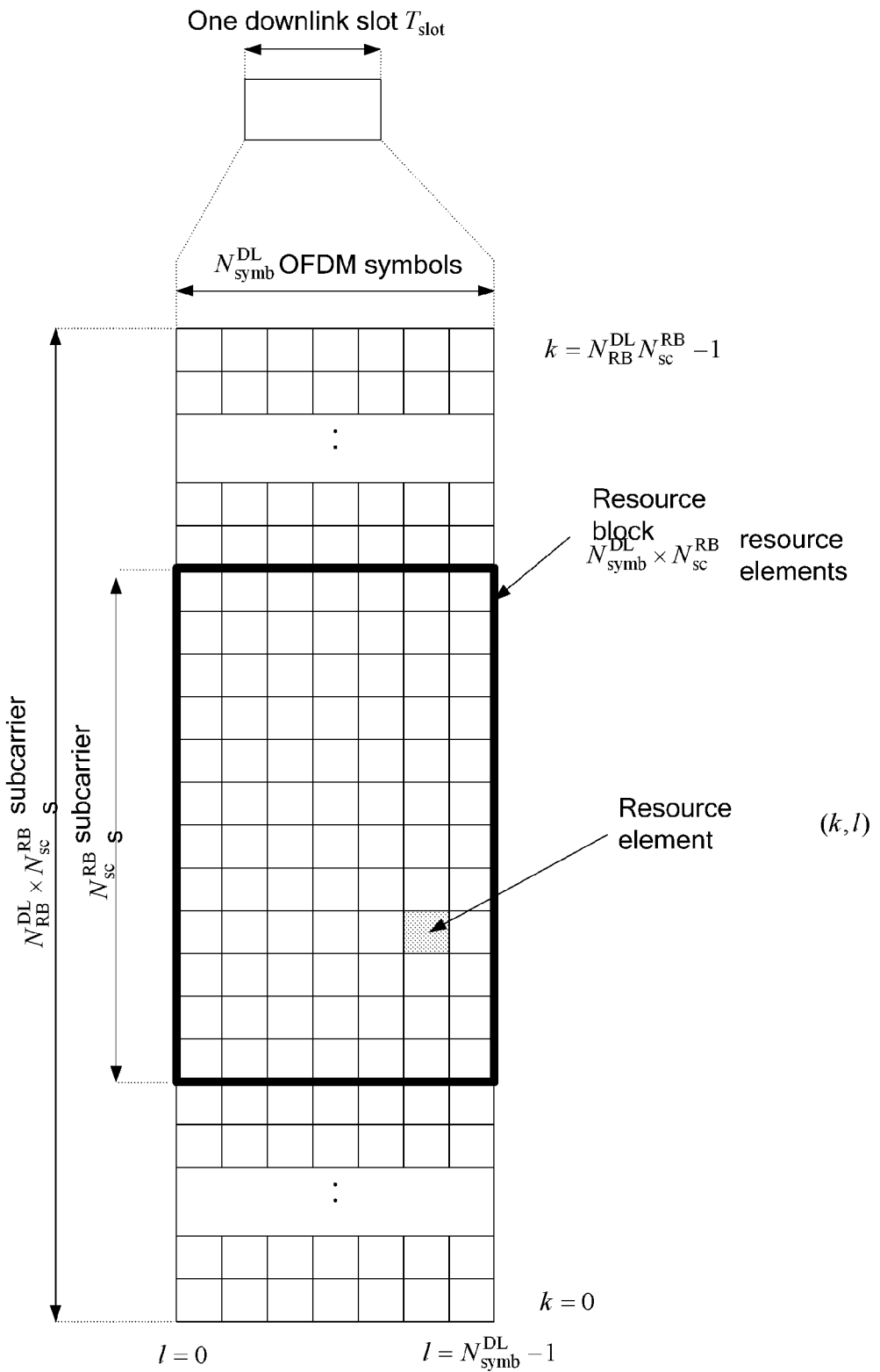
FIG. 2 is a schematic drawing illustrating an example of a grid of OFDM modulation resources in time and frequency domain.
Figure 3:
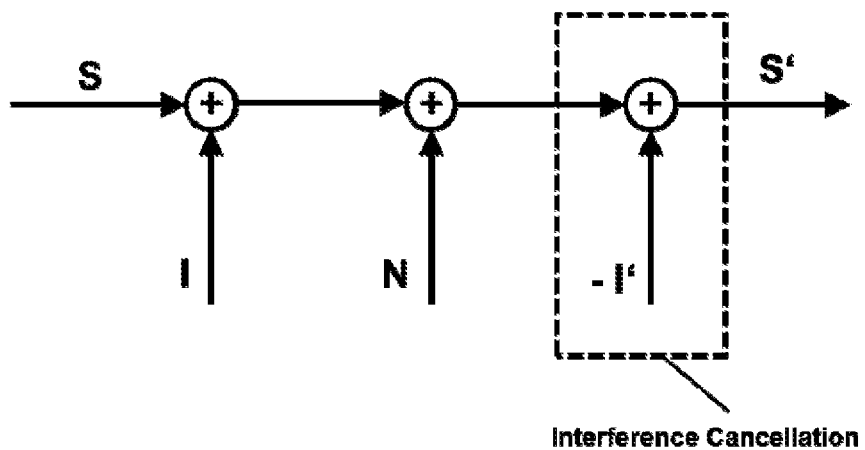
FIG. 3 is a block diagram illustrating interference cancellation.
Figure 4A:
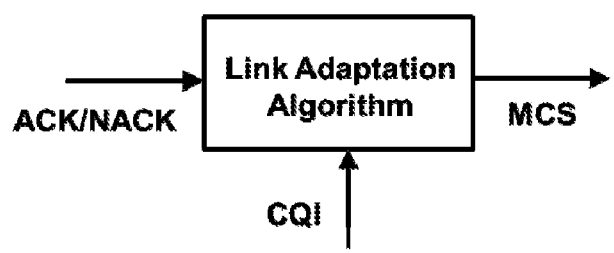
FIGS. 4A and 4B are block diagrams illustrating link adaptation with a one or two channel quality information reports per channel state information.
Figure 4B:
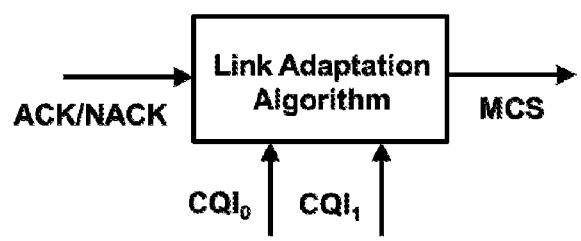

FIG. 4B shows a schematic representation of the link adaptation in terms of MCS selection with multiple CQI input ($CQI_0$ and $Ca_1$) as addressed in this invention report. As described above, the CSI reports in LTE generally consist of RI, PMI and CQI; the exact combination depends on the configured reporting mode. The CQI reports $CQI_0$ and $Ca_1$ can be interpreted as upper and lower bound for the achievable SINR level under the channel conditions on the reference resource by means of interference cancellation. $CQI_0$ and $CQI_1$ would in that case represent the CQI levels before and after performing interference cancellation (Pre-IC and Post-IC, respectively). The implementation of the link adaptation algorithm that makes use of the combination of both of these reported CQI values is not part of this invention report.

The provision of multiple CQI reports for different multiple interference hypotheses from the UE to the serving eNB in form of L1 signalling should advantageously meet the following design targets:

Minimization of additional control overhead: Each introduction of additional UE feedback results in additional overhead. A design principle is here that the overhead of the applied control signalling should not outweigh the expected throughput gains that can be achieved by means of interference cancellation in the receiver and corresponding MCS selection in the transmitter. It is therefore aspired to provide the multiple CQI reports for different interference hypotheses with minimum additional signalling overhead, especially taking into account the need for frequent CSI reporting for facilitating prudent dynamic link adaptation.

Minimum specification and implementation changes: The implied 3GPP specification changes should be possibly kept as small as possible in order to allow a smooth transition to new specification releases.

Provision of multiple CSI reports only if required: Multiple CQI reports should only be provided to the serving eNB UE if it is necessary. This requirement correlates with the need for minimization of control overhead.

An embodiment of the present invention relates to strategies for providing channel state information (CSI) for downlink transmission from a UE with an interference cancellation receiver to a serving eNB in an LTE system. In the following, different strategies are described for providing CSI with multiple interference hypotheses to the serving eNB with a single reporting message. This is advantageously achieved by reusing certain bits of existing Rel-11 CSI reporting formats or by introducing one or more new CSI reporting formats.

Figure 12:
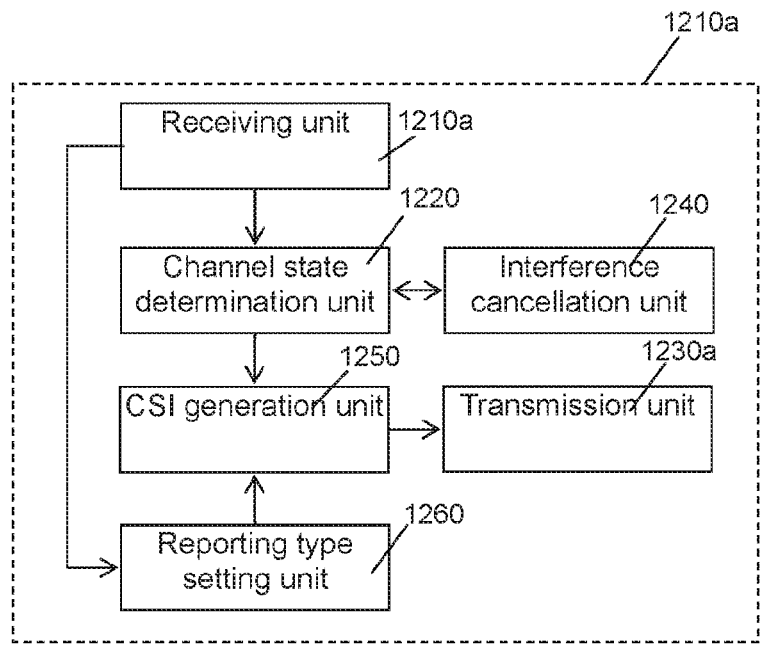
FIG. 12 is a block diagram illustrating apparatuses according to some embodiments of the present invention.
Figure 12:
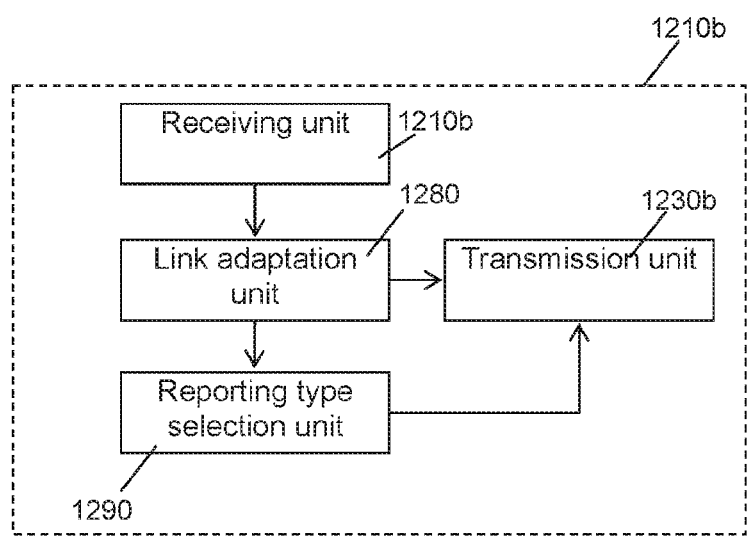

In particular, a solution is provided which envisages multiple CSI reports for different interference hypotheses for a single reference resource within a single CSI reporting message from an UE to the associated serving eNB. Accordingly, an apparatus 1200A for receiving data from a network node is provided as shown in FIG. 12, comprising a receiving unit 1210A for receiving a reference signal from the network node; a channel state determination unit 1220 for determining a first channel quality according to the reference signal received by the receiving unit and processed in accordance with a first interference hypothesis a second channel quality according to said reference signal and processed in accordance with another second interference hypothesis; and a transmission unit 1230A for transmitting the first channel quality and the second channel quality in a channel quality message to the network node.

The apparatus 1200A may be, for instance, a UE such as an LTE UE. However, it is noted that the present invention is not limited thereto and that, in general, the apparatus for receiving data may be any device which applies interference cancellation or suppression and provides feedback to any other device for the purpose of link adaptation. In particular, the present invention may be used for communication between a terminal and a base station or access point. Usually, the terminal is reporting feedback to the base station or to the access point. However, in general, the present invention is applicable also for the reversed case or for direct communication between terminals or any devices (such as base stations, access points or relays).

The reference signal is any predetermined signal known to the receiver and transmitted in predetermined resources which can serve for estimation of the channel conditions. For instance, in the LTE, the reference signals may be the CRS, cell reference signals, transmitted within particular OFDM symbols and subcarriers and defined in 3GPP TS 36.211.

The channel quality here may be any metric which reflects the channel conditions on the basis of the received signal and the signal as transmitted (known at the receiver, since reference signal). This may be the estimated SINR but also any other metric such as bit error rate or the like. The channel quality may also be reflected in the transport format which would have been necessary for reliably conveying the data in the estimated conditions such as the channel quality indicator contents. In context of the LTE, the channel quality may be the reported CQI contents.

An interference hypothesis is an assumption concerning the interference to which the receiving apparatus is subjected. Such assumption is important for further processing the received signal in order to better recover it. The interference hypothesis may be an assumption that there is no interference affecting the receiver. Accordingly, no particular processing is necessary to recover the received signal. Another examples of the assumptions are, for instance, assumption that the interfering signal was transmitted with certain configuration (e.g. modulation, coding, frequency or time allocation, power, etc.) or that certain load is present or absent in an interfering cell.

In other words, in accordance with an embodiment of the present invention, the first interference hypothesis corresponds to absence of interference and the second interference hypothesis corresponds to presence of interference. Advantageously, and the data receiving apparatus 1200A further comprises an interference cancellation unit 1240 for processing the received reference signal by interference cancellation or suppression in accordance with the second interference hypothesis. It is noted that it is only a specific embodiment of the interference hypotheses here, in which the interference power level for estimating the channel quality is considered before performing interference cancellation in the UE receiver (Pre-IC) and the interference power level after performing interference cancellation in the UE receiver (Post-IC). In general, the first hypothesis may be a first set of parameters indicating the characteristics of the assumed interferer and the second hypothesis may be a second set of parameters indicating the characteristics of the same or a different assumed interferer. Such parameters may be estimated by the receiving device or received from the network as described in the background of the invention above. Then, the interference cancellation unit may be further adapted to process the received reference signal by interference cancellation or suppression in accordance with the first interference hypothesis, too.

It is particularly advantageous to treat these Post-IC and Pre-IC CQI values (or CQI values determined by two respective different interference assumptions) as if two independent codeword CQIs are reported so that already specified Rel-11 CSI reporting for two codewords can be reused as much as possible in order to minimize required specification changes and the signalling overhead.

In other words, according to an embodiment of the present invention, the channel state determination unit 1220 is further configured to determine a third channel quality according to the reference signals transmitted in multiple layers; and the apparatus 1200A further comprises a channel state information generation unit 1250 for generating the channel state information message which comprises: either the first and the second channel quality or the third channel quality. In particular, this concept focuses on using LTE Rel-11 CSI reports for two codewords for the purpose of reporting CQI values for different interference hypotheses (Post-IC and Pre-IC) within a single reporting message. Depending on channel and traffic load conditions, the CSI reporting can be switched between two CQI reports for two codewords with a single interference hypothesis (Pre-IC) and two CQI reports for a single codeword with two different interference hypotheses (Post IC and Pre-IC). The assumption is here that the UEs which will benefit from performing the interference cancellation are mainly cell-edge UEs with low to very low SINR levels due to strong interference. The scheduling of two codewords is in LTE used for transmissions on multiple spatial layers and transmission on multiple spatial layers are most beneficial in case of high SINR level which corresponds to cell-centre UEs that experience low interference power-levels. Cell-edge UEs that experience high interference power levels would rather be scheduled with single layer transmissions of a single codeword in order to maximize the SINR. The implied restriction that the UEs which will perform interference cancellation cannot report CQI values for two codewords is therefore not expected to affect the throughput performance of the system in a negative way.

Figure 5:
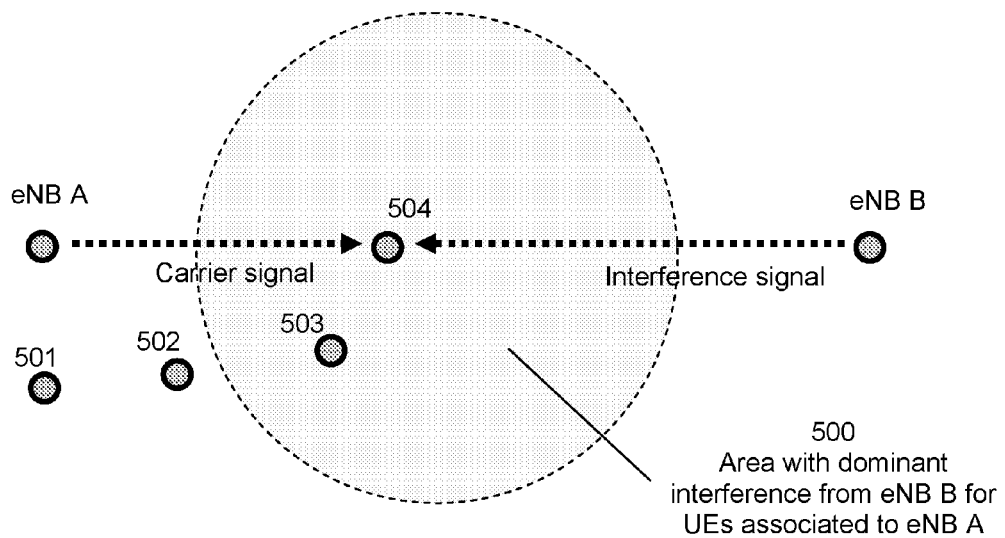
FIG. 5 is a schematic drawing illustrating different interference scenarios for terminals in the proximity of two base stations.
Figure 6:
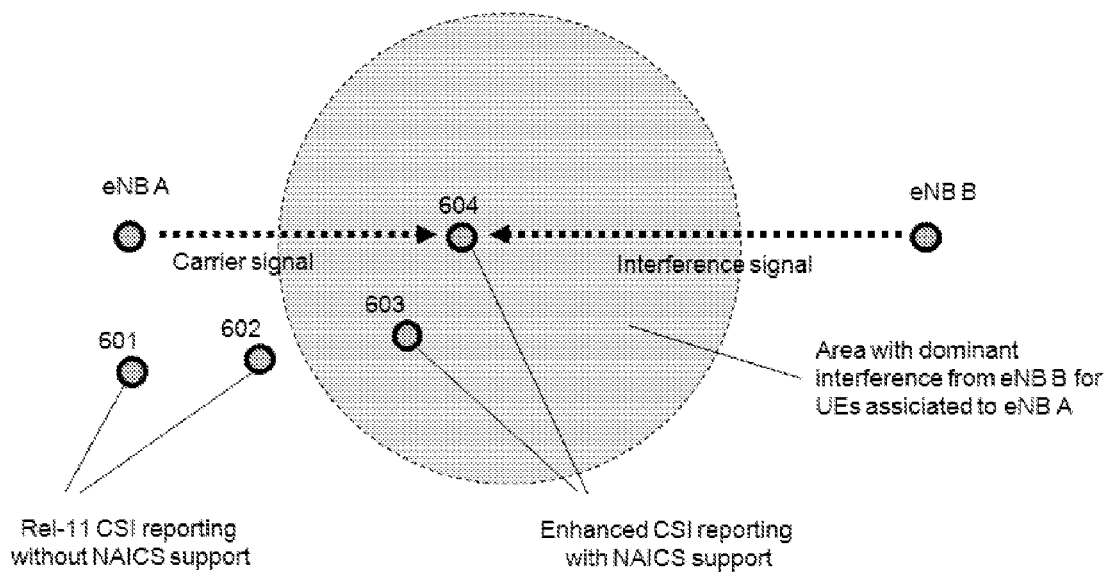
FIG. 6 is a schematic drawing illustrating the format of the channel state information message in LTE PUSCH reporting format 3-1.
Figure 15:
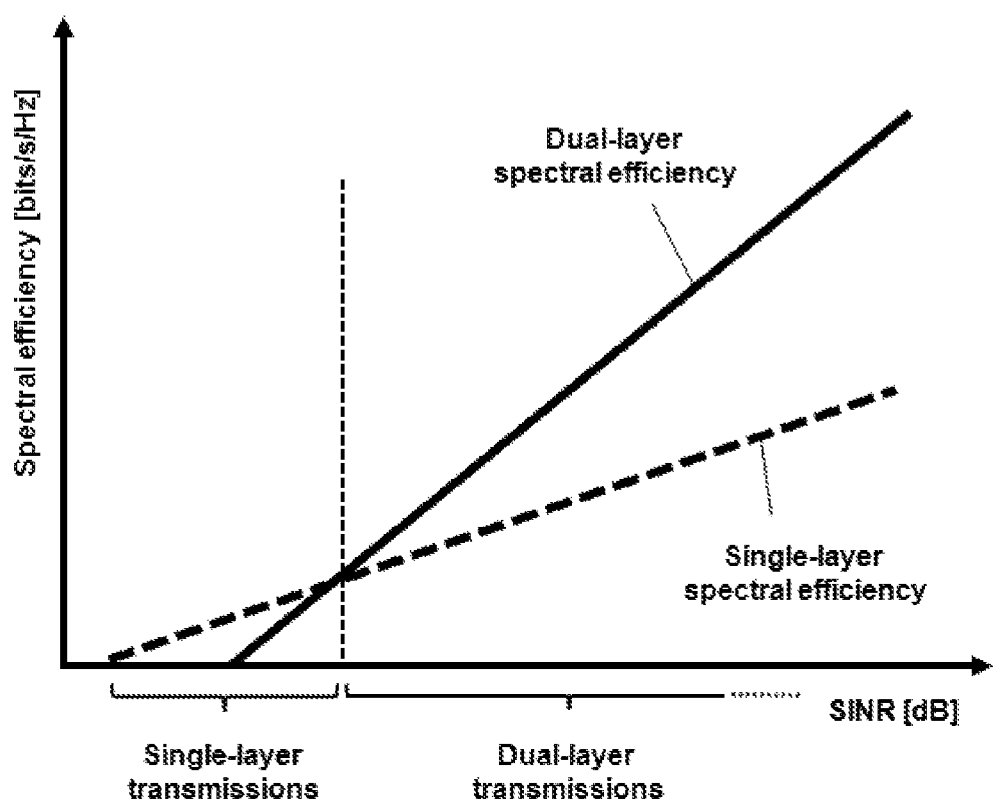
FIG. 15 is a graph schematically illustrating the spectral efficiency for the single-layer and dual-layer transmission.

The rationale for the assumption described above is explained by FIG. 15. The dependency between spectral efficiency and SINR level in dB can be approximated by a linear relation. Doubling the number of spatial layers doubles the spectral efficiency as well if it is assumed that the transmit power level on each layer is the same as in case of the single-layer transmission and that there is not mutual interference between the layers. If the transmit power used for the single-layer transmission has to be shared between the layers in case of multi-layer transmissions and if mutual interference between the layers cannot be neglected, the dual-layer spectral efficiency will be reduced as schematically depicted in FIG. 15: Spectral efficiency of single-layer and dual-layer transmissions. The application of the above concept in a typical NAICS scenario as described with reference to FIG. 5 is shown in FIG. 6. The UEs at positions 601 and 602 do not experience strong interference from eNB B and will therefore not perform interference cancellation and will make use of Rel-11 CSI reporting. The UEs at positions 603 and 604 experience strong interference from eNB B are therefore candidates for performing cancellation of interference from eNB B. These UEs will benefit from enhanced CSI reporting for facilitating proper link adaptation in combination with interference cancellation. UEs at the positions 3 and 4 are not expected to be scheduled for transmission over multiple spatial layers (with two codewords) due to the low to very low SINR levels. The above concept is confined to reporting CQI levels for different interference hypotheses since it is expected that the spatial pre-coder for beamforming (represented by the PMI) will most likely be the same for both Pre-IC and Post-IC assuming single layer transmissions. The rationale is that the optimum pre-coder for a single layer transmission should be selected in a way so that the transmission power is steered into the direction of the receiving UE position, which will be the same for both Pre-IC and Post-IC assumptions.

A multilayer transmission consists basically in the superposition of multiple single-layer transmissions. In order to minimize the mutual interference between the different spatial layers in the receiver, the transmitter applies different pre-coders for the different layer aiming for orthogonalization of the different transmission layers. Since perfect orthogonalization can normally not be achieved, there will be a certain amount of residual interference between the spatial layers. Furthermore, the overall transmit power has to be shared between the different layers. Due to these aspects, the multi-layer transmission will yield a reduced SINR (and hence increased capacity) on each layer compared to a single layer transmission. The capacity gains of multi-layer transmissions are realized by the sum capacity of all used spatial layers while each layer capacity contribution itself is smaller than the single-layer transmission capacity itself. This is illustrated in FIG. 15.

In the LTE, UEs transmit a rank indicator (RI) to the serving eNB as part of the CSI reporting. This RI indicates the number of spatial transmissions layers that the UE is capable of handling for PDSCH receptions under the current channel and interference conditions. The interpretation of the PMI that is transmitted as a part of the CSI report is determined by the RI value associated to the PMI report. The PMI indicates a pre-coder codebook entry for RI spatial transmission layers. The pre-coder codebook in the LTE specifications are represented by two-dimensional tables where the columns represent the number of spatial layers corresponding to the RI and the rows that are indicated by the PMI contain different pre-coding matrices/vectors for the given number of spatial layers as defined in 3GPP TS 36.211 and 3GPP TS 36.212.

In accordance with an embodiment of the present invention which relates to implementation of the invention within the LTE system, a reinterpretation is provided of the linkage between PMI and RI in CSI reports which are configured for NAICS. Instead of indicating a certain number of spatial layers on the transmitter side, the RI indicates the number of interference hypotheses, and hence the number of CQI values for a single codeword, of a CSI report for a single layer transmission.

In other words, the channel state message has advantageously the following format. When the third channel quality is signaled, the channel state message includes a rank indicator RI indicating the number of layers transmitted by multiple antennas, the third channel quality including channel quality CQI A; CQI B for one or more codewords in accordance with the number of layers indicated by the rank indicator and a pre-coding matrix indicator PMI indicating a pre-coding matrix. When on the other hand the first and the second channel quality is signaled, the channel state message includes instead of the RI (i.e. in the message field corresponding to the RI) a hypotheses number indicator indicating the number of hypotheses for which the channel quality is signaled (one or two, or more), the first (CQI A*) and/or the second channel quality (CQI B*) for the number of hypotheses according to the hypotheses number indicator, and a pre-coding matrix indicator (PMI) indicating a pre-coding matrix. The pre-coding indicator may have the same or a different format for depending on whether the first-type and second-type or third-type quality information is transmitted. The embodiments mostly described here show alternative signaling of two CQIs either for two codewords or for two interference hypotheses. Such configurations are beneficial especially in view of reusing the Rel-11 reporting format. However, the present invention is not limited thereby and may be extended to signaling a plurality (greater than 2) of CQIs for the respective different interference hypotheses instead of the same number of codewords. Moreover, in general the number of codewords for which the CQI is transmittable within one CSI message may be smaller or greater than the number of interference hypotheses for which the CQI can be transmitted.

In the following, a detailed description is provided of the corresponding exemplary adaptation of PUSCH CSI reporting Mode 3-1 as specified in the LTE with CQI reporting for higher-layer configured subband sets and a single PMI. It is noted that the following description focuses on an aperiodic CSI reporting mode since it is considered to be of highest priority for frequency selective scheduling in combination with dynamic pre-coder selection. However, the present invention is not limited to aperiodic feedback signaling and may be also applied for periodic reporting. The NAICS CSI reporting according to this exemplary implementation differs from the CSI reporting in Release 11 in that the CQI values represent different interference hypotheses rather than different codewords. Moreover, the PMI in the NAICS report represents a single-layer pre-coder for any hypotheses indicator values, which correspond in the message format to the rank indicator values of Release 11.

Figure 7:
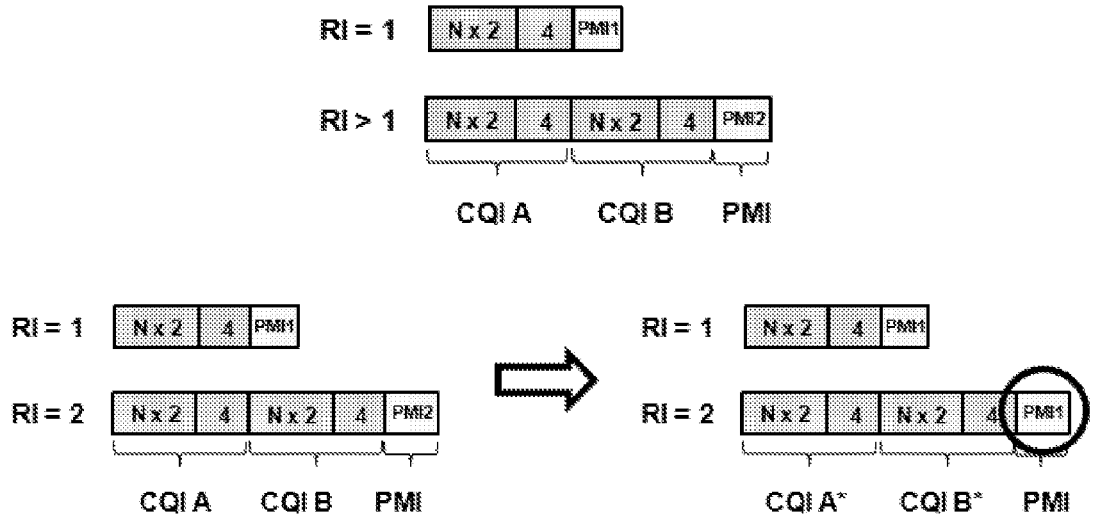
FIG. 7 is a schematic drawing illustrating an exemplary reuse of the Release 11 CSI message for the purpose of NAICS feedback reporting.

This is shown in FIG. 7, of which the fields representing various indicators are described in the following Table 1.

TABLE 1

| Identifier | Description |
| --- | --- |
| CQI A | Rel-11 CQI for first codeword |
| CQI B | Rel-11 CQI for second codeword |
| CQI A* | NAICS CQI for single codeword with first interference hypothesis (e.g. Pre-IC) |
| CQI B* | NAICS CQI for single codeword with second interference hypothesis (e.g. Post-IC) |
| PMI1 | Precoding matrix indicator for single-layer transmissions |
| PMI2 | Precoding matrix indicator for dual-layer transmissions |
| N | Number of subbands |

In particular, the channel state information signaling of the Release 11, LTE is shown in the upper part of FIG. 7. The length and generally the format of the channel state information message depends on the value of the RI. If the RI is equal to 1, it means that a single layer transmission feedback is transmitted. Accordingly, only a CQI for a single codeword and the PMI1 is included in addition to the RI. The CQI contains a wideband CQI with a length of 4 bits and N subband CQIs with length of 2 bits for the respective N subbands. The number of subbands N is configurable. PMI1 is a PMI which identifies a pre-coding matrix for a single layer transmission. If RI is greater than 1, CQI for multiple layers is signaled. The CQI is signaled for two layers corresponding to two (in general) different codewords transmitted in parallel by the multiple antennas. This results in CQI A for the first codeword and CQI B for the second codeword. Each of these CQI A and CQI B contains a wideband CQI of 4 bots and N times 2-bit subband CQI. The PMI2 is a PMI which identifies a pre-coding matrix for a two-layer transmission. The PMI1 and PMI2 thus differ in that their respective same values point possibly to different pre-coding matrices—to respective matrices for single-layer transmission and multiple-layer transmission.

In the bottom part of FIG. 7, the reuse of the Release 11 CSI message for the purpose of NAICS feedback reporting according to this exemplary implementation is illustrated. On the left side, the above described Release-II CSI report is shown. On the right side, the NAICS report reusing the format of the Rel-11 CSI report is shown. In particular, the channel state information message has the same length when signaling first and second channel quality as when signaling the third channel quality; wherein the pre-coding matrix indicator has the same length when indicating pre-coding matrix for multiple-layer transmission as well as single-layer transmission; and the rank indicator RI and the hypothesis indicator have the same length (or in other words, the hypothesis indicator is signaled within the corresponding RI field).

As can be seen in the example of FIG. 7, the PMI in the NAICS reporting (on the right side) is the PMI1, which corresponds to the PMI for single-layer transmission since it is assumed that the reporting for multiple interference hypotheses is only performed for single-layer transmission. Nevertheless, the PMI1 and PMI2 in this example have still the same length.

In the following, details of the PMI reporting for PUSCH CSI reporting Mode 1-3 for different numbers of transmit (TX) antenna ports supported by LTE are shown in accordance with this exemplary implementation as described above. In LTE, the antenna may have 2, 4 or 8 antenna ports, i.e. antennas which are used for beamforming in a particular spatial direction (single-layer transmission) or for parallel transmission of different data (multi-layer transmission). However, it is noted that the present invention is not limited to 2, 4, or 8 antennas and the number of antennas may also be any number greater than 1 and also greater than 8. Also, the present examples show two-layer transmission. However, the present invention is generally not limited thereto and can be extended to transmission of more layer such as 3, 4 or more and—possibly correspondingly—to more interference hypotheses.

In case of eight transmit antenna ports, in LTE, both the single layer PMI1 and the dual-layer PMI2 are indicated by eight bits. The current pre-coder is determined by a combination of a first PMI and a second PMI, both indicated by four bits individually in case of one or two spatial layers (RI=1 or RI=2). A single-layer PMI can therefore be transmitted also in a Rel-11 reporting format associated to RI=2 without further adaptations. Accordingly, for the 8 transmitting antenna ports, the Rel-11 CSI message can be easily adapter to transmit instead of RI the hypothesis indicator, instead of CQI per codeword the CQI per interference hypothesis and instead of PMI2 the PMI2, since the PMI1 (single-layer) and PMI2 (double-layer) have the same length.

In the case of four transmit antenna ports, both single and dual-layer PMIs in LTE are indicated by four bits. A single-layer PMI1 can therefore be transmitted in a Rel-11 reporting format associated to RI=2 without further adaptations as in previously described case of 8 Tx antenna ports.

Thus, for a first number of antenna ports (such as 8 or 4) the channel quality information for one codeword has the same length as the channel quality information for one interference hypothesis.

However, in the case of two transmit antenna ports, a single-layer PMI in LTE is indicated by two bits and a dual-layer PMI is indicated by one bit. This means that the Rel-11 reporting format associated to RI=2 cannot be used for reporting a single-layer PMI without additional modifications. Different exemplary solutions for reporting a 2-bit single-layer PMI in the Rel-11 reporting format for RI=2 are described in the following embodiments for two transmit antenna ports, as shown in FIG. 8.

Figures 8A, 8B:
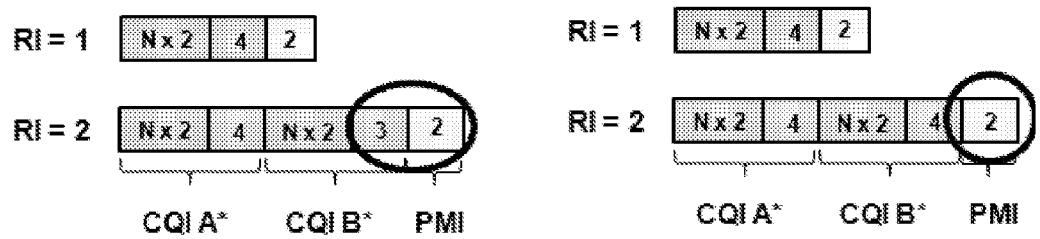
FIGS. 8A, 8B and 8C are schematic drawings illustrating exemplary formats of the PMI in the channel state information message for two antenna ports.

A first advantageous approach is to take one bit from the second wideband CQI (CQI B*) and reinterpret it as the second bit used for the 2-bit single-layer PMI as shown in FIG. 8A. Instead of indicating the second wideband CQI with four bits for the absolute CQI level, it could be indicated by a 3-bit differential CQI value with respect to the first wideband CQI level. Such a 3-bit differential report covers eight differential levels; this corresponds to approximately 16 dB following the Rel-11 specification, which is considered sufficient for covering the expected SINR differences between Pre-IC and Post-IC reports.

As can be seen in FIG. 8A, for a second number of antenna ports the channel quality information for one interference hypothesis has shorter length (3+2*N in FIG. 8A) than the channel quality information for the other one interference hypothesis (4+2*N in FIG. 8A) and at least its part is coded differentially with respect to the other one interference hypothesis. In particular, the CQI includes a wideband CQI which is coded differentially and subband CQIs which are not. However, it is noted that in general, also one or more of the subband CQIs may be coded differentially whereas the wideband CQI may be coded individually. Here, the "channel quality for one interference hypothesis" is either the first channel quality or the second channel quality and "the other one" is then the second channel quality or the first channel quality, respectively. In this way, the CSI for Rel-11 reporting can still be used for the NAICS reporting and PMI for the single layer may be conveyed within the corresponding NAICS report. Thanks to taking the one bit from one of the CQIs signaled, the PMI1 in the NAICS report may have the same length as PMI2 and thus, the PMI1 may also be signaled when both CQIs are included. The format of the Rel-11 may remain unchanged, which contributes to better backward compatibility.

Figure 8C:
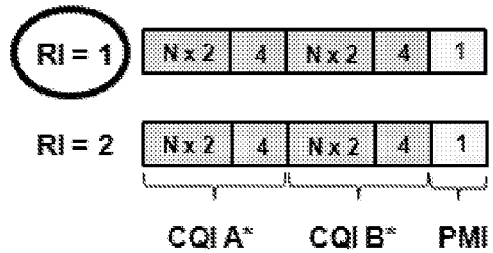

A second advantageous approach of handling the difference between the length of PMI1 and PMI2 in Rel-11 is to extend the reporting format size for RI=2 by one bit in case of NAICS CSI reporting as shown in 8B. This approach allows for full flexibility in terms of reporting the second wideband CQI since it is not restricted to a 3-bit differential report as in the above example of FIG. 8A A. However, the increased reporting format size for RI=2 increases the signaling overhead and accounts for more implementation changes than example of FIG. 8A. In other words, the channel state information message in accordance with FIG. 8B has the greater length when signaling first and second channel quality than when signaling the third channel quality, wherein the pre-coding matrix indicator has the same length (2 bits in FIG. 8B) when indicating pre-coding matrix for multiple-layer transmission as well as single-layer transmission, the first, the second and the third quality have the same length (4+2*N in FIG. 8B), and the rank indicator and the hypothesis indicator have the same length. It is noted that this format of FIG. 8B may be used for a certain number of antenna ports whereas for other antenna ports a different format may be used. In LTE, since the length of PMI1 is equal to PMI2 for the number of antenna ports 4 and 8, in such case, the format of Rel-11 may be fully reused such that the RI and CQI lengths of the Rel-11 reporting and NAICS reporting are also the same as well as the CSI message size. Only for antenna ports number of 2, a modified Rel-11 format is used as shown in FIG. 8A, 8B or 8C. However, the present invention is not limited to the LTE and therefore, formats 8A, 8B, and 8C may also be applied to all or any numbers of the antenna ports in general.

A third advantageous approach is shown in FIG. 8C. In contrast to the previous two embodiments, the reporting format size for RI=1 is modified for NAICS signaling in this case, whereas the reporting format for RI=2 remains the same as in Rel-11. The same format will be used for NAICS CSI reporting with both RI=1 and RI=2. The used reporting format is the Rel-11 format for RI=2 with one bit for the PMI indication. The codebook index for the single-layer precoding with two transmit antenna ports is given by the combination of RI and PMI as described exemplarily in the table below (Table 3 on the right hand side). The corresponding codebook index indication in Rel-11 is shown in the table below (Table 2 on the left hand side).

TABLE 2

Rel-11 CSI report

| Codebook Index | RI | PMI |
|---|---|---|
| 0 | 1 | 0 |
| 1 | 1 | 1 |
| 2 | 1 | 2 |
| 3 | 1 | 3 |

TABLE 3

NAICS CSI report

| Codebook Index | RI | PMI |
|---|---|---|
| 0 | 1 | 0 |
| 1 | 1 | 1 |
| 2 | 2 | 0 |
| 3 | 2 | 1 |

In other words, the the size of the channel state information message has the same size for single-layer transmission and for multiple-layer transmission. Moreover, the single-layer pre-coding matrix to be applied for the transmission is given by a combination of the value of the rank indicator (or hypothesis indicator) and the pre-coding-matrix indicator rather than by the pre-coding matrix indicator itself.

The following table shows Rel-11 pre-coding matrix (vector) for a given codebook index. The codebook index for RI=1 (number of layers equal to 1) is signaled by the PMI which can take corresponding values 0-3.

| Codebook index | Number of layers υ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{\sqrt{2}}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{\sqrt{2}}\begin{bmatrix}1 & 1\\j & -j\end{bmatrix}$ |
| 3 | $\frac{1}{\sqrt{2}}\begin{bmatrix}1\\-j\end{bmatrix}$ | — |

According to the above described exemplary embodiment, the same codebook indexes for a single-layer transmission may be indicated by a combination of RI value and PMI value. For instance, codebook index 0 corresponds to RI=1, PMI=0; index 1 corresponds to RI=1, PMI=1; index 2 corresponds to RI=2, PMI=0; and index 3 corresponds to RI=2, PMI=1.

In some cases it might be beneficial to report different PMIs for Pre-IC and Post-IC CSI reports since the angle of arrival of the dominant interference contribution in the UE can be different for Pre-IC and Post-IC CSI reports. Correspondingly to the examples described above, the description focuses here on the Rel-11 PUSCH CSI reporting Mode 1-3 with a single PMI and a sub-band specific CQI(s). However, it is noted that the present invention is not limited to this example. Any other reporting mode may be reused in a similar manner. Moreover, reporting in other systems than the LTE may be implemented in accordance with the present invention.

An approach is to increase the payload size of the report in case of NAICS by the number of bits required for the second PMI. Accordingly, the channel state information message includes a first-hypothesis precoding matrix indicator indicating precoding matrix for the first interference hypothesis and a second-hypothesis precoding matrix indicator indicating precoding matrix for the second interference hypothesis. However, an extension of the CSI length by adding a supplemental PMI may reduce signalling efficiency.

In order to keep the Rel-11 reporting format size, bits from the second wideband CQI may be used for reporting a second PMI, details are described below. The assumption is that the CQI reports for the second interference hypothesis can be covered sufficiently by the differential subband reports. Thus, in addition, the size of the second channel quality indicator is smaller than the size of the first channel quality indicator; and the size of the channel state information message is equal when the first and second channel quality is signaled and when the third channel quality is signaled. This is shown in FIG. 9 for different numbers of transmit antenna ports. The detailed exemplary embodiments for different number of transmit antenna ports are described in the following.

Figure 9A:
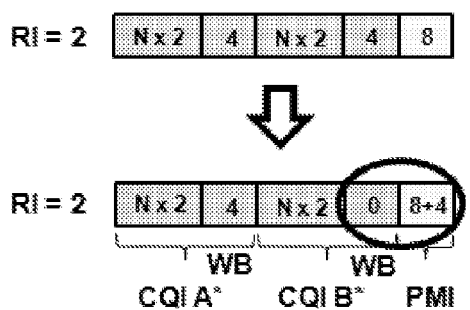
FIGS. 9A, 9B and 9C are schematic drawings illustrating the format of the channel state information message according to an embodiment of the invention.

FIG. 9A illustrates an example for 8 antenna ports. Accordingly, 8+4 bits instead of 8+8 bits are used for reporting two rank-1 PMIs (i.e. PMIs for single-layer transmission) namely H1-PMI1 and H2-PMI1. A rank-1 precoder for eight antenna ports is given by the multiplication of two pre-coding vectors described by two 4 bit long PMI1 components PMI1-i1 and PMI1-i2 in the Rel-11 specification. In this embodiment, it is assumed that the same component PMI1_i1 for both interference hypotheses is sufficient, i.e. H1-PMI1-i1=H2-PMI1-i1. Thus, only 4 bits are required for the first pre-coder component i1 indication and further two times (for the first and the second hypothesis) 4 bits for the second component i2 of the respective H1-PMI1 and H2-PMI1.

As explained above, the reported pre-coder for eight transmit antenna ports is determined by a combination of a first PMI component and a second PMI component, each of the components indicated by four bits individually. Each of these two PMI components indicates a certain pre-coding matrix/vector, and the aggregate pre-coder for the eight transmit antenna ports is then determined by the multiplication of these two pre-coders as described in Section 7.2.4 of 3GPP TS 36.213, fully cited above.

In order to indicate two single-layer pre-coders with the Rel-11 reporting format, it is assumed that the first pre-coder for the first interference hypothesis H1 is as in Rel-11 indicated by eight bits (four bits for each of the two pre-coder components H1-PMI1-i1 and H1-PMI1-i2 for the multiplication), while the second pre-coder for the second interference hypothesis is indicated by only four bits H2-PMI1-i2, as shown in FIG. 9A. The first pre-coding component for the second interference hypothesis H2-PMI1-i1 is assumed to be the same as the first pre-coding matrix/vector indicated for the multiplication that determines the aggregate pre-coder for the first interference hypothesis H1-PMI1-i1. In other words, each of the first-hypothesis pre-coding matrix indicator H1-PMI and the second-hypothesis pre-coding matrix indicator H2-PMI consists of two components i1 and i2, which together specify the pre-coding to be applied for the transmission, and the channel state information message includes one common first component indicator which is common for the first-hypothesis pre-coding matrix indicator and the second-hypothesis pre-coding matrix indicator, i.e. H1-PMI-i1=H2-PMI-i1, and includes separate respective second components for the first-hypothesis pre-coding matrix indicator H1-PMI-i2 and the second-hypothesis pre-coding matrix indicator H2-PMI-i2.

In order to keep the size of the CSI message same as in Rel-11, there is no wideband (WB) CQI for the second interference hypothesis (e.g. Post-IC) in this embodiment. The CQI report for the second interference hypothesis consists only of differential subband reports with two bits (corresponding to four differential levels) per subband. The reference for these differential subband reports for the second interference hypothesis could either be the wideband CQI report for the first interference hypothesis or the individual subband CQI report for the first interference hypothesis, where the latter is already given by a differential report with respect to the first wideband CQI report as specified in TS 36.213, fully cited above.

Combining the concept for reporting a single PMI for both interference hypotheses as described above with reference to FIG. 8 and the concept for multiple PMIs, the RI can be used for differentiating different reports as shown below in Table 4. The abbreviations WB, SB and SL stand for wideband, subband and single-layer, respectively.

TABLE 4

| RI | WB CQI A* | SB CQI A* | SL PMI A* | WB CQI B* | SB CQI B* | SL PMI B* |
|----|-----------|-----------|-----------|-----------|-----------|-----------|
| 1  | 4 | N x 2 | 4+4 | 0 | 0 | 0 |
| 2  | 4 | N x 2 | 4+4 | 4 | N x 2 | 0 |
| 3  | 4 | N x 2 | 4+4 | 0 | N x 2 | 4 |
| 4  | 4 | N x 2 | 4   | 0 | N x 2 | 4+4 |

Column RI indicates the value of the rank indicator. The column WB CQI A* indicates number of bits for the WB CQI transmitted for the first interference hypothesis. In this example, it is always 4 bits long. The column SB CQI A* indicates the length of the subband CQIs for the first interference hypothesis and is in this embodiment N×2 bits. However, it is noted that these sizes are only exemplary and, in general, the subband CQI may have other size than 2 bits. The column SL PMI A* indicates the size of the PMI(s) namely either 4+4 bits (two PMI components i1 and i2) or 4 bits (one component i2). Column WB CQI B* indicates number of bits for the WB CQI transmitted for the second interference hypothesis. In this example, it is 0 or 4 bits long, depending on whether its size is necessary for transmitting the second PMI for the second interference hypothesis. Column SB CQI B* indicates the length of the subband CQIs for the second interference hypothesis and is in this embodiment N×2 bits dor multi-layer transmission and 0 for the single layer transmission. Finally, the column SL PMI B* indicates the number of bits for the PMI related to the second hypothesis. This can be 0 bits (if such PMI is not supported), 4 bits (if only the component i2 is transmitted and component i1 is considered to be same as for the first hypothesis) or 4+4 bits (if both components i1 and i2 are transmitted).

The CSI reporting for eight transmit antenna ports supports the reporting of an RI value between 1 and 8. In addition to the RI interpretation given in Table 4, higher RI values (5, 6, 7 and 8) could be used for indicating, which interference hypotheses were used for the corresponding CSI report. The potential interference hypotheses (e.g. which neighbouring eNB is subject to interference cancellation) would have to be configured by means of higher-layer signalling.

In summary, according to the present embodiment, each of the first channel quality (CQI A) and the second channel quality (CQI B) consists of a wideband channel quality indicator (WB) and of N subband channel quality indicators (N×2) which are coded differentially with respect to the wideband channel quality indicator, N being a positive integer, i.e. a number larger or equal to 1. Advantageously, the first and the second subband channel quality indicators have the same length; and the first and the second wideband channel qualities are assumed to be equal and a common wideband channel quality indicator instead of the first and the second wideband indicators is transmitted. It is noted that the above example is presented for the 8 antenna ports. This is because of the current format in the Rel-11 LTE, which is reused here, providing backward compatibility. However, in general, the present invention is not limited thereto and the above exemplified reporting format may also be used for other numbers of antenna ports or independently of the number of antenna ports. The same applies for the following particular examples for 4 and 2 antenna ports.

Figure 9B:
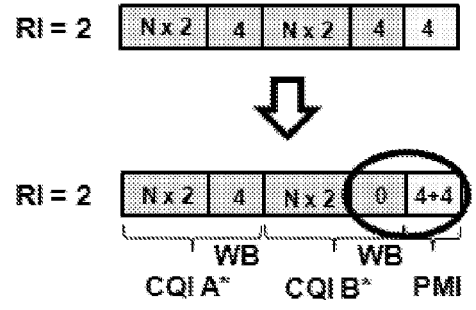

FIG. 9B illustrates an example for 4 antenna ports. Accordingly, 4+4 bits are required for reporting two rank-1 (single-layer) PMIs. All 4 bits are taken from the second wideband CQI and thus, the second wideband CQI is assumed to be the same as the first wideband CQI.

In particular, both single-layer PMI1 and dual-layer PMI2 are indicated by four bits as described above. That means that eight bits are required for indication of one individual single-layer PMI for each interference hypothesis (Pre-IC and Post-IC) in the Rel-11 reporting format for RI=2. As done in the case with the eight transmit antenna ports described above, the four bits for the second interference hypothesis PMI are taken from the second wideband (WB) CQI report in this embodiment, corresponding to the eight transmit antenna case, that means there is no wideband CQI for the second interference hypothesis. The CQI report for the second interference hypothesis consists only of N differential subband reports with two bits (corresponding to four differential levels) per subband; the reference for the differential coding is either the wideband report associated to the first interference hypothesis or the individual subband report for the first interference hypothesis. In differential coding, only a difference between the signal to be encoded and the reference is encoded rather than the signal itself.

Combining the concept for reporting a single PMI for both interference hypotheses as described above and the concept of signalling multiple PMIs, the RI can be used for differentiating different reports as described in the following Table 5. The abbreviations WB, SB and SL stand for wideband, subband and single-layer, respectively.

TABLE 5

| RI | WB CQI A* | SB CQI A* | SL PMI A* | WB CQI B* | SB CQI B* | SL PMI B* |
|----|-----------|-----------|-----------|-----------|-----------|-----------|
| 1  | 4 | N x 2 | 4 | 0 | 0 | 0 |
| 2  | 4 | N x 2 | 4 | 4 | N x 2 | 0 |
| 3  | 4 | N x 2 | 4 | 0 | N x 2 | 4 |

Figure 9C:
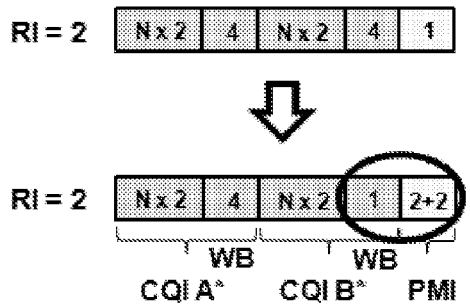

Table 5 exemplifies reporting formats for two interference hypotheses with four transmit antenna ports. In particular, each row of the table corresponds to a different format of the feedback report (CSI message). The first row shows a format in which RI field (hypothesis indicator) value 1 determines that CQI for one hypothesis only is transmitted. Accordingly, a single CQI is included, containing wideband part with length of 4 and subband parts with length of N×2 bits. Moreover, the pre-coder setting (pre-coding matrix indicator) is signaled in 4 bits. The RI field value 2 indicates that CQI for two hypotheses is transmitted. Accordingly, a two CQIs are included, each containing wideband part with length of 4 and subband parts with length of N×2 bits. Moreover, the pre-coder setting (pre-coding matrix indicator) is signaled in 4 bits only for the first hypothesis. The RI field value 3 indicates that CQI for two hypotheses is transmitted. Accordingly, two CQIs are included, each containing subband parts with length of N×2 bits. The wideband part with length of 4 is only present for one of the hypotheses, assuming that it is equal for both hypotheses. Moreover, the pre-coder setting (pre-coding matrix indicator) is signaled in 4 bits for each of the first hypothesis and second hypothesis. In case of two transmit antenna ports, single-layer and dual-layer PMI are indicated by two bits and one bit, respectively, as described above. That means that four bits are required for indication one individual single-layer PMI for each interference hypothesis (Pre-IC and Post-IC) in the Rel-11 reporting format for RI=2 where only a single bit is provided for PMI reporting. FIG. 9C shows an example of a reporting format for 2 antenna ports. Accordingly, 2+2 bits are required for reporting two single-layer PMI1s (PMIs for RI=1). In order to possibly reuse the Rel-11 reporting format, 3 bits are taken from the second wideband (WB) CQI, so that the second WB CQI has the length of 1 bit instead of 4 bits. In other words, the second wideband CQI is described by one bit offset compared to first wideband CQI. Corresponding to the eight and four transmit antenna cases, bits have to be taken from the second wideband (WB) CQI for the second interference hypothesis. In order to provide four bits for the PMI reporting within the Rel-11 reporting format, three bits are taken from the second wideband CQI. The wideband CQI for the second interference hypothesis is then given by a single differential bit with respect to the wideband CQI for the first interference hypothesis.

In summary, in the embodiment shown with reference to FIG. 9C, each of the first channel quality and the second channel quality consists of a wideband channel quality indicator and of N subband channel quality indicators which are coded differentially with respect to the wideband channel quality indicator, N being a positive integer; the first and the second subband channel quality indicators have the same length; and the first and the second wideband channel quality indicators have different non-zero lengths and one of the two wideband channel quality indicators is differentially encoded with respect to the other one wideband channel quality indicator.

Figure 10:
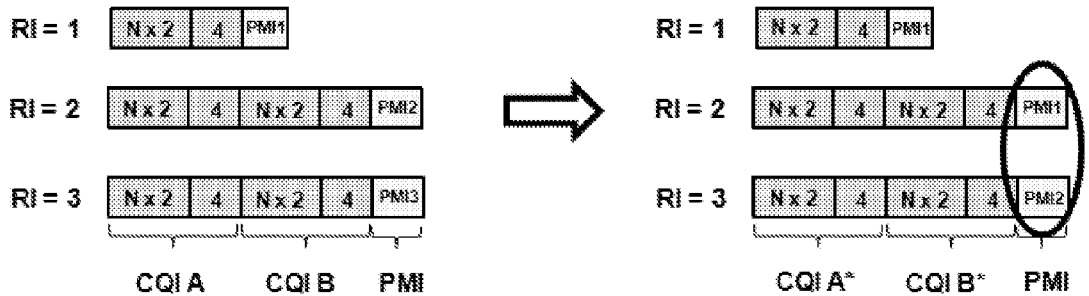
FIG. 10 is a schematic drawing illustrating the format of the channel state information message according to an embodiment of the invention.

In some cases it might be beneficial to allow the NAICS UE to report CQI and PMI for dual-layer transmission even in combination with NAICS CSI reporting. Corresponding to the embodiments described above, the description will focus here (for the sake of example only) on the Rel-11 PUSCH CSI reporting Mode 1-3 with a single PMI and subband specific CQI. The concept in FIG. 10 shows, how the RI can be used for the corresponding NAICS CSI reporting in accordance with this embodiment.

RI=1 indicates a single-layer PMI (PMI1) plus one CQI (CQI A*), i.e. a CQI for a single interference hypothesis.

RI=2 indicates a single-layer PMI (PMI1) plus two CQIs for single codeword but two different interference hypotheses (for instance CQI A* for Pre-IC and CQI B* for Post-IC, respectively).

RI=3 indicates a dual-layer PMI (PMI2) plus two CQIs for single codeword but two different interference hypotheses (CQI A* for Pre-IC and CQI B* for Post-IC, respectively).

The following Table 6 and Table 7 show the exemplary reporting format adaptations for four and eight transmit antenna ports according to the present embodiment. The abbreviations WB, SB, SL and DL stand for wideband, subband, single-layer and dual-layer, respectively.

TABLE 6

| RI | WB CQI A* | SB CQI A* | SL PMI A* and B* | DL PMI A* and B* | WB CQI B* | SB CQI B* |
|---|---|---|---|---|---|---|
| 1 | 4 | N x 2 | 4 | 0 | 0 | 0 |
| 2 | 4 | N x 2 | 4 | 0 | 4 | N x 2 |
| 3 | 4 | N x 2 | 0 | 4 | 4 | N x 2 |

TABLE 7

| RI | WB CQI A* | SB CQI A* | SL PMI A* and B* | DL PMI A* and B* | WB CQI B* | SB CQI B* |
|---|---|---|---|---|---|---|
| 1 | 4 | N x 2 | 4+4 | 0 | 0 | 0 |
| 2 | 4 | N x 2 | 4+4 | 0 | 4 | N x 2 |
| 3 | 4 | N x 2 | 0 | 4+4 | 4 | N x 2 |

In particular, Table 6 shows reporting formats for single and dual-layer PMIs with four transmit antenna ports and Table 7 shows reporting formats for single and dual-layer PMIs with eight transmit antenna ports. Each row of table 6 and 7 corresponds to a different format of the feedback report (CSI message). In table 6, the first row shows a format in which RI field (hypothesis indicator) value 1 determines that CQI for one hypothesis only is transmitted. Accordingly, a single CQI is included, containing wideband part with length of 4 and subband parts with length of N×2 bits. Moreover, the pre-coder setting (pre-coding matrix indicator) is signaled in 4 bits. The RI field value 2 indicates that CQI for two hypotheses is transmitted. Accordingly, a two CQIs are included, each containing wideband part with length of 4 and subband parts with length of N×2 bits. Moreover, the pre-coder setting (pre-coding matrix indicator) is signaled in 4 bits only for the first hypothesis. The RI field value 3 indicates that CQI for two hypotheses is transmitted. Accordingly, two CQIs are included, each containing subband parts with length of N×2 bits and the wideband part with length of 4. Moreover, a common dual-layer pre-coder setting (pre-coding matrix indicator) is signaled in 4 bits for both the first hypothesis and second hypothesis. Table 7 differs from Table 6 in that for RI field value 3, the wideband part with length of 4 is only present for one of the hypotheses, assuming that it is equal for both hypotheses. Moreover, the dual-layer pre-coder setting (pre-coding matrix indicator) is signaled in 4 bits for each of the first hypothesis and second hypothesis.

In other words, in this embodiment, the channel state information message includes a rank indicator filed, of which: a first value indicates that the channel state information message further includes a pre-coding matrix indicator for a single spatial layer and a only the first channel quality; a second value indicates that the channel state information message further includes a pre-coding matrix indicator for a single spatial layer, the first channel quality and the second channel quality; and a third value indicates that the channel state information message further includes a pre-coding matrix indicator for multiple spatial layers, the first channel quality and the second channel quality.

The reporting of CQI for multiple codewords in combination with two difference interference hypotheses (Pre-IC and Post-IC) may be further facilitated by either specifying that an single CQI applies for both codewords, or by increasing the reporting format size in order to covey four CQIs (Pre-IC and Post-IC for two codewords). The current specification of LTE supports furthermore the mapping of a single codeword onto multiple spatial layers as defined in Table 6.3.3.2-1 in TS 36.211.

Figure 11:
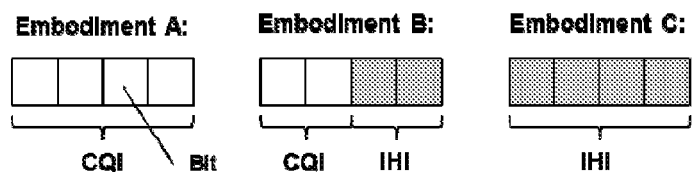
FIG. 11 is a schematic drawing illustrating the format of the channel state information message according to an embodiment of the invention.

In accordance with another example of the present invention, the (four) bits reserved for the second wideband CQI are divided into a certain number of bits for differential CQI referring to the first wideband CQI and a certain number of bits for indicating which interference hypotheses have been used for determining the CQI values. In general, one of the first and the second channel quality has a greater size than the respective other one; the number of bits corresponding to positive difference between the size of the first and the second quality is used as an interference hypothesis indicator for indicating the interference hypothesis for which the lower-size channel quality is provided. The size of one of the channel qualities may also be zero. FIG. 11 shows different exemplary options for using the wideband CQI bit field. In particular, FIG. 11 shows (re)interpretation of Rel-11 wideband CQI bits for the second codeword according to embodiments A, B and C as described below.

According to embodiment A, all wideband CQI bits of the original (Rel-11) bit field for the second codeword are used for reporting the wideband CQI for the second interference hypothesis assumption; that is the approach followed in the variants described above with reference to FIGS. 8, 9 and 10.

According to embodiment B, two bits of the wideband CQI report of the original (Rel-11) bit field for the second codeword are used for reporting the wideband CQI for the second interference hypothesis assumption, and two bits are used for the interference hypotheses indication (IHI) which informs the receiving eNB about the interference hypotheses that have been used for determining the second CQI value or, alternatively, both of the first and second CQI values. The second wideband CQI level is then advantageously given by a differential report with respect to the first wideband CQI level.

The size of 2 bits for the second CQI and 2 bits for IHI are only exemplary and in general, the second CQI may have 1 or 3 bits and the IHI correspondingly 3 or 1 bit, respectively in this LTE-specific example. However, for other systems or even for LTE, the size of the IHI and the second CQI may also be set differently. In particular, the IHI may also be transmitted without taking bits from the second CQI. It may take bits from the first CQI or from PMI or RI. It may also be signaled separately, without taking any bits from other fields. In such case, the channel state information message for NAICS reporting would have different format than Rel-11.

The two (in general any number of) IHI bits could be used for distinguishing four different interference hypotheses combinations. Such combinations may identify, for instance, different eNBs that are considered as interfering for the purpose of interference cancellation or suppression. According to one example, the IHI identifies only the second hypothesis applied for determining the second quality. For instance, it is assumed that the first quality is a quality determined without applying any processing for interference cancellation or suppression and the second hypothesis is identified by the IHI. According to another example, the IHI identifies a combination of a first and the second hypothesis applied to determine the respective first and second quality. This combination may be jointly or separately encoded.

The different interference hypotheses would have to be configured in advance by means of higher-layer signaling (RRC). In other words, IHI in the above example is 2 bit long which corresponds to 4 different values. The assignment between these values and particular hypotheses (or hypothesis combinations) needs to be known in advance. In order to make it configurable, the higher-layer signaling may provide means such as information elements included in predefined messages which define the assignment.

Embodiment C represents an extreme case, in which all four bits of the wideband CQI are used for IHI. Accordingly, it can be distinguished between 16 interference hypotheses combinations. A wideband CQI report for the selected interference hypotheses cannot be provided in this case, if the reporting format is to be compatible with the existing formats. Subband CQI reporting for the selected interference hypothesis would still be possible if it is assumed that reference for the corresponding differential CQI reporting is either the first wideband CQI level or for each subband the respective first subband CQI level.

Another issue is the possibility of configuring the NAISC CSI Reporting. The following are different exemplary options for distinction between CSI reporting with and without multiple interference hypotheses, where the latter corresponds to the Rel-11 CSI reporting:

Semi-static configuration by means of higher-layer signalling (RRC)

Dynamic request by eNB by means of CSI request on (E)PDCCH, a corresponding DCI format extension would be required (one bit)

Dynamic indication by UE within the report itself; this would require the introduction of additional bit in the CSI report.

In other words, the apparatus for data receiving comprises also a reporting type setting unit 1260 for setting the interpretation of the channel state information message to either message transmitting the first channel quality and the second channel quality or a message transmitting third channel quality on the basis of at least one of: semi-static higher-layer signaling; dynamic signaling in a request to transmit the channel state information message request transmitted to the apparatus, or dynamic signaling in the channel state information message, within a reporting type indicator.

The term semi-static means that the configuration of the reporting type (codewords or hypotheses) is performed less frequently than the reporting itself. Thus, even if the reporting type is configurable, the configuration is not performed for each report (CSI message) but rather for a plurality of such messages. The term dynamic refers to the possibility of changing the reporting type for each report.

Figure 14:
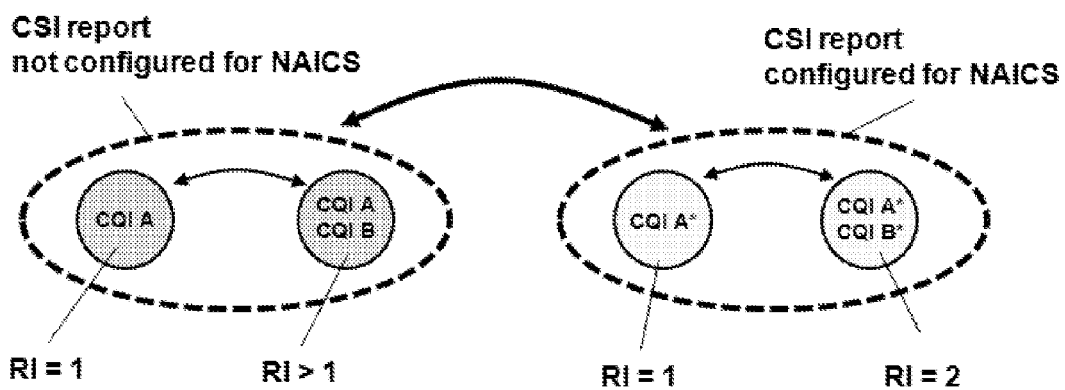
FIG. 14 is a schematic drawing illustrating a mechanism for configuring the type of feedback reporting.

The exemplary CSI reporting states and state transitions are shown in FIG. 14. In particular, two main states are distinguished: 1) transmission of CSI reports not configured for NAICS (such as Rel-11 reports) and 2) transmission of CSI reports configured for NAICS (such as those described in the above embodiments and including CQI for plural interference hypotheses). These states are shown by dashed ellipses in FIG. 14. Each of these two states includes two internal sub-states which determine the reporting format namely a first format for RI=1 in which only a single CQI is reported (CQI A for one codeword only or CQI A* for one hypothesis only) and a second format for RI>1 in which (at least) two CQIs are reported (CQI A, B for the respective two different codewords or CQI A*, B* for the respective two different interference hypotheses).

The above description related to apparatus for data receiving apparatus. Another embodiment of the present invention provides a data transmitting apparatus working correspondingly to the data receiving apparatus described above. In particular, the data transmitting apparatus is capable and configured to receive channel state information message according to one or more of the above described embodiments and examples.

An apparatus 1200b for transmitting data according to this embodiment comprises a receiving unit 1210b for receiving a first channel quality and a second channel quality in a channel state information message received from a data receiving apparatus, the first channel quality being determined in accordance with a first interference hypothesis, the second channel quality being determined in accordance with another second interference hypothesis; a link adaptation unit 1280 for determining link configuration based on the first channel quality and the second channel quality; and a transmission unit 1230b for transmitting to a data receiving apparatus the data according to the determined link parameters. In this context the link configuration refers to the transmission parameters such as the pre-coder, modulation and coding scheme, etc. The link configuration here is beneficially performed on the basis of the feedback report carried by the CSI message received format data receiving apparatus as described above.

The present invention may also be embodied in a method for receiving data from a network node, the method comprising the steps of: receiving 1310 a reference signal from the network node; determining 1340 a first channel quality according to the reference signal received by the receiving unit and processed 1330 in accordance with a first interference hypothesis and a second channel quality according to said reference signal and processed 1330 in accordance with another second interference hypothesis; and transmitting 1360 the first channel quality and the second channel quality in a channel quality message to the network node.

Furthermore, the present invention may be embodied in a method for transmitting data to be executed in a network node, the method comprising the steps of: receiving a first channel quality and a second channel quality in a channel state information message received from a data receiving apparatus, the first channel quality being determined in accordance with a first interference hypothesis, the second channel quality being determined in accordance with another second interference hypothesis; determining link configuration based on the first channel quality and the second channel quality; and transmitting to a data receiving apparatus the data according to the determined link parameters.

The method for receiving data and transmitting the feedback info may further comprise the step of processing the received reference signal by interference cancellation or suppression in accordance with the second interference hypothesis and/or in accordance with the first hypothesis. As described in the above embodiments concerning the CSI reporting format, which were described in the context of an apparatus, but which equally apply for the corresponding methods, the first interference hypothesis may be the absence of interference and the second interference hypothesis may be the presence of interference. Alternatively, the two hypotheses may refer to different respective interference parameter sets applied as hypotheses for determining the CQIs. Such parameter sets may be parameter sets for different interferers such as different interfering cells (eNBs) or parameter sets including different parameters considered for the same interferer.

Moreover, the above methods may also include determining a third channel quality for multiple spatial layers according to the reference signals. This step may be performed alternatively to the step of determining the first and the second quality so that for generating a single CSI message, either the first and the second channel quality, or the third channel quality is determined.

In order to facilitate this, as described above the channel state information message has the following format: when signaling the third channel quality: a rank indicator indicating the number of layers transmitted by multiple antennas, the third channel quality including channel quality for a plurality of codewords in accordance with the number of layers indicated by the rank indicator and a pre-coding matrix indicator indicating a pre-coding matrix for multi-layer transmission, and when signaling the first and the second channel quality: hypotheses indicator indicating the hypotheses for which the channel quality is signaled, the first and/or the second channel quality for the hypotheses according to the hypotheses indicator, and a pre-coding matrix indicator indicating a pre-coding matrix for single-layer transmission.

Moreover, all embodiments and examples described above such as those described with reference to FIGS. 7 to 11 apply equally for these methods. In particular a step of determining the channel qualities and the step of generating the CSI message operate by generating the above introduced CSI message formats.

Figure 13:
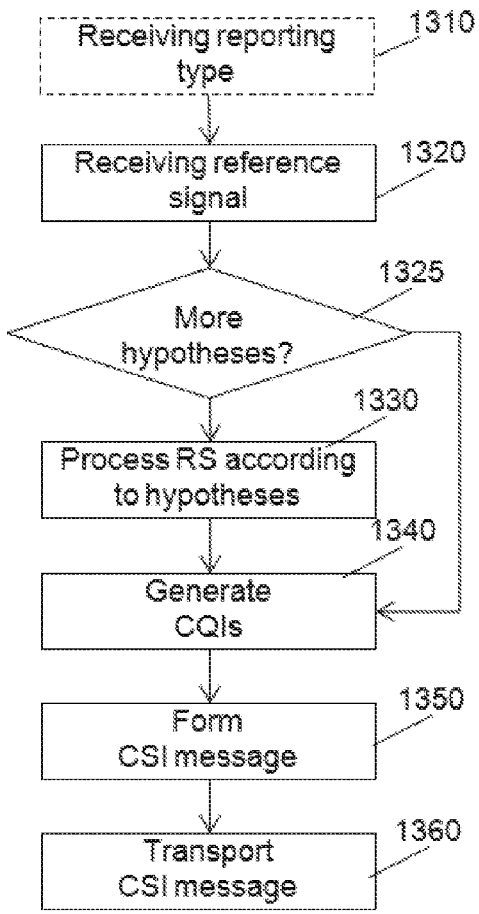
FIG. 13 is a flow diagram illustrating methods according to some embodiments of the present invention.

The method for receiving data and transmitting the feedback may further include the step of setting the interpretation of the channel state information message to either message transmitting the first channel quality and the second channel quality or a message transmitting third channel quality on the basis of at least one of: semi-static higher-layer signaling, dynamic signaling in a request to transmit the channel state information message request transmitted to the apparatus, or dynamic signaling in the channel state information message, within a reporting type indicator. Finally, the method for data receiving may further include a step of receiving data from a network node or from another node. Such other node or network node advantageously receives the CSI message and adapts the link parameters accordingly. In particular, based on the received CQIs for the different hypotheses, it selects the transport format including modulation and coding scheme. The method for transmitting the feedback report is exemplified in the flow diagram of FIG. 13. In particular, the type of reporting may be set by means of receiving it 1310 from the network node or another node as a configuration statically or dynamically as described above. The type of reporting specifies whether Rel-11 reports or NAICS reports are to be set, i.e. whether the third quality (reports per codeword) or the first and second quality (reports per interference hypotheses) are to be generated 1340, 1350 and transmitted 1360. However, the present invention is not limited thereto and the step of receiving the reporting type 1310 is not essential since the reporting may also be set according to some fixed rules so that the setting and resetting thereof becomes obsolete.

The method further includes the step 1320 of receiving the reference signal. Then, depending 1325 on whether CQI is to be determined for a plurality of hypotheses, the CQI is determined 1340 either based on a processed reference signal (processed in step 1330 in accordance with the corresponding interference hypothesis, such as post-IC, pre-IC) or based on the reference signal for 1 or more codewords. The CQIs generated 1350 are then included into the CSI message, which is formed further by RI and PMI(s) according to any above described examples and embodiments. The CSI message as generated, is then transmitted 1360 to the network node (eNB, relay) or the other node such as another user's device.

In accordance with another aspect of the present invention, a computer program product comprising a computer-readable medium having a computer-readable program code embodied thereon is provided, the program code being adapted to carry out the present invention.

According to an aspect of the present invention the above apparatus is embodies on an integrated circuit.

The explanations given in the Technical Background section above are intended to better understand the specific exemplary embodiments described herein and should not be understood as limiting the invention to the described specific implementations of processes and functions in the mobile communication network such as a network compliant with the 3GPP standards. Nevertheless, the improvements proposed herein may be readily applied in the architectures/systems described in the Technological Background section and may in some embodiments of the invention also make use of standard and improved procedures of theses architectures/systems. It would be appreciated by a person skilled in the art that numerous variations and/or modifications may be made to the present invention as shown in the specific embodiments without departing from the spirit or scope of the invention as broadly described.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

The present invention relates to reporting feedback concerning reception quality under at least two different assumptions of interference conditions, i.e. two interference hypotheses. In particular, a first and a second reception quality are determined for the same reference resource under two different interference hypotheses. The first and the second reception quality are then transmitted within the same channel state message.

The invention claimed is:

1. An apparatus for receiving data from a network node, comprising
 a receiver, which, in operation, receives a reference signal from the network node;
 circuitry, which, in operation, determines a first channel quality according to the reference signal received by the receiver and processed in accordance with a first interference hypothesis, and determines a second channel quality according to the reference signal received by the receiver and processed in accordance with a second interference hypothesis, wherein
  one of the first and second channel qualities has a greater size than the other one, and
  a number of bits corresponding to a positive difference between sizes of the first and second qualities is used for an interference hypothesis indicator for indicating an interference hypothesis for which a lower-size channel quality is provided; and
 a transmitter, which, in operation, transmits the first channel quality and the second channel quality in a channel quality message to the network node.

2. The apparatus according to claim 1, wherein the first interference hypothesis corresponds to an absence of interference, the second interference hypothesis corresponds to a presence of interference, and the circuitry, in operation, processes the reference signal by interference cancellation or suppression in accordance with the second interference hypothesis.

3. The apparatus according to claim 1, wherein the circuitry, in operation, determines a third channel quality according to the reference signals for multiple spatial layers, and generates a channel state information message which includes:
 either the first and the second channel quality,
 or the third channel quality.

4. The apparatus according to claim 3, wherein the channel state information message has the following format:
 when signaling the third channel quality: a rank indicator indicating a number of layers transmitted by multiple antennas, the third channel quality including channel quality for a plurality of codewords in accordance with the number of layers indicated by the rank indicator and a pre-coding matrix indicator indicating a pre-coding matrix for multi-layer transmission, and
 when signaling the first and the second channel quality: a hypotheses indicator, the first channel quality or the second channel quality, and a pre-coding matrix indicator indicating a pre-coding matrix for single-layer transmission.

5. The apparatus according to claim 4, wherein:
 the channel state information message has the same length when signaling first and second channel quality as when signaling the third channel quality;
 the pre-coding matrix indicator has the same length when indicating pre-coding matrix for multiple-layer transmission as well as single-layer transmission; and
 the rank indicator and the hypothesis indicator have the same length.

6. The apparatus according to claim 5, wherein for a first number of antenna ports, channel quality information for one interference hypothesis has shorter length than channel quality information for another interference hypothesis and at least its part is coded differentially with respect to the another interference hypothesis.

7. The apparatus according to claim 5, wherein, for a first number of antenna ports, channel quality information for one codeword has the same length as channel quality information for one interference hypothesis.

8. The apparatus according to claim 7, wherein the size of the channel state information message has the same size for single-layer transmission and for multiple-layer transmission.

9. The apparatus according to claim 4, wherein:
the channel state information message has the greater length when signaling first and second channel quality than when signaling the third channel quality;
the first, the second, and the third quality have the same length;
the pre-coding matrix indicator has the same length when indicating pre-coding matrix for multiple-layer transmission as well as single-layer transmission; and
the rank indicator and the hypothesis indicator have the same length.

10. The apparatus according to claim 9, wherein:
a common wideband channel quality indicator is transmitted, or
each of the first channel quality and the second channel quality includes a wideband channel quality indicator and N subband channel quality indicators which are coded differentially with respect to the wideband channel quality indicator, wherein
N is a positive integer,
first and second subband channel quality indicators have the same length, and
the wideband channel quality indicators for the first channel quality and the second channel quality have different non-zero lengths and are encoded differentially from each other.

11. The apparatus according to claim 3, wherein:
the channel state information message includes a first-hypothesis precoding matrix indicator indicating pre-coding matrix for the first interference hypothesis, and a second-hypothesis precoding matrix indicator indicating precoding matrix for the second interference hypothesis;
the size of a second channel quality indicator is smaller than the size of a first channel quality indicator; and
the size of the channel state information message is equal when the first and second channel quality is signaled and when the third channel quality is signaled.

12. The apparatus according to claim 11, wherein:
each of the first-hypothesis pre-coding matrix indicator and the second-hypothesis pre-coding matrix indicator consists of two components, which together specify a pre-coding to be applied for transmission; and
the channel state information message includes one common first component which is common for the first-hypothesis pre-coding matrix indicator and the second-hypothesis pre-coding matrix indicator, and separate respective second components for the first-hypothesis pre-coding matrix indicator and the second-hypothesis pre-coding matrix indicator.

13. The apparatus according to claim 1, wherein the circuitry, in operation, generates a channel state information message, and the channel state information message includes a rank indicator, of which:
a first value indicates that the channel state information message further includes a pre-coding matrix indicator for a single spatial layer and the first channel quality;
a second value indicates that the channel state information message further includes a pre-coding matrix indicator for a single spatial layer, the first channel quality, and the second channel quality; and
a third value indicates that the channel state information message further includes a pre-coding matrix indicator for multiple spatial layers, the first channel quality, and the second channel quality.

14. The apparatus according to claim 3, the circuitry, in operation, sets interpretation of the channel state information message to either a message transmitting the first channel quality and the second channel quality, or a message transmitting the third channel quality on the basis of at least one of:
semi-static higher-layer signaling,
dynamic signaling in a request to transmit the channel state information message request transmitted to the apparatus, or
dynamic signaling in the channel state information message, within a reporting type indicator.

15. An apparatus for transmitting data, comprising:
a receiver, which, in operation, receives a first channel quality and a second channel quality in a channel state information message received from a data receiving apparatus, the first channel quality being determined in accordance with a first interference hypothesis, the second channel quality being determined in accordance with a second interference hypothesis, wherein
one of the first and second channel qualities has a greater size than the other one, and
a number of bits corresponding to a positive difference between sizes of the first and second qualities is used for an interference hypothesis indicator for indicating an interference hypothesis for which a lower-size channel quality is provided;
circuitry, which, in operation, determines link configuration based on the first channel quality and the second channel quality; and
a transmitter, which, in operation, transmits to the data receiving apparatus the data according to the determined link configuration.

16. A method for receiving data from a network node, comprising:
receiving a reference signal from the network node;
determining a first channel quality according to the reference signal received by the receiver and processed in accordance with a first interference hypothesis;
determining a second channel quality according to the reference signal received by the receiver and processed in accordance with a second interference hypothesis, wherein
one of the first and second channel qualities has a greater size than the other one, and
a number of bits corresponding to a positive difference between sizes of the first and second qualities is used for an interference hypothesis indicator for indicating an interference hypothesis for which a lower-size channel quality is provided; and
transmitting the first channel quality and the second channel quality in a channel quality message to the network node.

17. A method for transmitting data to be executed in a network node, comprising:
receiving a first channel quality and a second channel quality in a channel state information message received from a data receiving apparatus, the first channel quality being determined in accordance with a first interference hypothesis, the second channel quality being determined in accordance with a second interference hypothesis, wherein
one of the first and second channel qualities has a greater size than the other one, and
a number of bits corresponding to a positive difference between sizes of the first and second qualities is used for an interference hypothesis indicator for indicating an interference hypothesis for which a lower-size channel quality is provided;

determining link configuration based on the first channel quality and the second channel quality; and transmitting to the data receiving apparatus the data according to the determined link configuration.

* * * * *